US012576748B2

(12) United States Patent
Khaykin et al.

(10) Patent No.: US 12,576,748 B2
(45) Date of Patent: Mar. 17, 2026

(54) DATA COLLECTION AND ANALYSIS-BASED DEVICE MONITORING

(71) Applicant: VIAVI SOLUTIONS INC., San Jose, CA (US)

(72) Inventors: Oleg Khaykin, Scottsdale, AZ (US); Adam Nowotarski, Indianapolis, IN (US); Pascal Donzel, La Talaudière (FR); Kevin J. Oliver, Fisher, IN (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 1019 days.

(21) Appl. No.: 17/563,888

(22) Filed: Dec. 28, 2021

(65) Prior Publication Data

US 2022/0332217 A1 Oct. 20, 2022

(30) Foreign Application Priority Data

| | | |
|---|---|---|
| Apr. 16, 2021 | (EP) | 21305505 |
| Apr. 16, 2021 | (EP) | 21305506 |
| Jul. 20, 2021 | (EP) | 21186792 |

(51) Int. Cl.
*B60L 58/18* (2019.01)
*B60L 3/00* (2019.01)
(Continued)

(52) U.S. Cl.
CPC ............. *B60L 58/18* (2019.02); *B60L 3/0046* (2013.01); *G07C 5/008* (2013.01);
(Continued)

(58) Field of Classification Search
CPC ....................................................... B60L 58/18
(Continued)

(56) References Cited

U.S. PATENT DOCUMENTS

| | | | |
|---|---|---|---|
| 10,276,901 B2 | 4/2019 | Yao | |
| 2004/0201361 A1* | 10/2004 | Koh | H02J 50/10 |
| | | | 320/104 |

(Continued)

FOREIGN PATENT DOCUMENTS

| | | |
|---|---|---|
| CN | 1839301 A | 9/2006 |
| CN | 101750057 A | 6/2010 |

(Continued)

OTHER PUBLICATIONS

Han et al., "Multi-Scale Low-Entropy Method for Optimizing the Processing Parameters during Automated Fiber Placement", Materials 2017, 10, 1024, Sep. 3, 2017, 18 pages. <https://www.mdpi.com/1996-1944/10/9/1024/htm>.

(Continued)

*Primary Examiner* — Yalkew Fantu

(74) *Attorney, Agent, or Firm* — Mannava & Kang, P.C.

(57) ABSTRACT

According to examples, data collection and analysis-based device monitoring may include obtaining, at a monitoring data collector, from an optical fiber of a sensing membrane that is used to monitor a thermal property of a device, monitoring data associated with the monitoring of the thermal property of the device. The monitoring data may be forwarded to a monitoring data analyzer that is remote from the monitoring data collector. Based on an analysis of the monitoring data by the monitoring data analyzer, an indication of an operational status of the device may be received from the monitoring data analyzer. A device controller may control, based on the indication of the operational status of the device, an operation of the device.

20 Claims, 17 Drawing Sheets

(51) Int. Cl.
  *G07C 5/00* (2006.01)
  *H01M 10/42* (2006.01)

(52) U.S. Cl.
  CPC .. *H01M 10/425* (2013.01); *H01M 2010/4271*
  (2013.01); *H01M 2220/20* (2013.01)

(58) Field of Classification Search
  USPC ......................................................... 320/116
  See application file for complete search history.

(56) References Cited

U.S. PATENT DOCUMENTS

| | | | |
|---|---|---|---|
| 2009/0115607 A1 | 5/2009 | Beinhocker | |
| 2014/0203783 A1 | 7/2014 | Kiesel et al. | |
| 2015/0340744 A1 | 11/2015 | Knobloch et al. | |
| 2017/0011667 A1 | 1/2017 | Sanchez et al. | |
| 2017/0033414 A1* | 2/2017 | Ganguli | G01D 5/353 |
| 2017/0129361 A1 | 5/2017 | Scaringe | |
| 2017/0248462 A1* | 8/2017 | Farhadiroushan | G01H 9/004 |
| 2018/0321325 A1* | 11/2018 | Fortier | H01M 10/48 |
| 2018/0364115 A1 | 12/2018 | Brown et al. | |
| 2019/0006157 A1 | 1/2019 | O'Banion et al. | |
| 2019/0100105 A1 | 4/2019 | Liu et al. | |
| 2021/0031650 A1* | 2/2021 | Reeves | B60L 50/64 |
| 2022/0311060 A1* | 9/2022 | Wang | G01R 31/3842 |
| 2024/0310207 A1 | 9/2024 | Cuenot et al. | |
| 2024/0310208 A1 | 9/2024 | Graves et al. | |

FOREIGN PATENT DOCUMENTS

| | | |
|---|---|---|
| CN | 102292622 A | 12/2011 |
| CN | 102947678 A | 2/2013 |
| CN | 103376066 A | 10/2013 |
| CN | 107817286 A | 3/2018 |
| CN | 108718534 A | 10/2018 |
| CN | 108749607 A | 11/2018 |
| CN | 109457902 A | 3/2019 |
| CN | 110285768 A | 9/2019 |
| CN | 110633486 A | 12/2019 |
| CN | 111102934 B | 3/2021 |
| DE | 102020105308 A1 | 11/2020 |
| EP | 2187472 A2 | 5/2010 |
| EP | 2672234 | 12/2013 |
| EP | 2928006 A1 | 10/2015 |
| EP | 2975366 A1 | 1/2016 |
| EP | 2978043 A1 | 1/2016 |
| EP | 3525279 A1 | 8/2019 |
| WO | 2017/040525 A1 | 3/2017 |

OTHER PUBLICATIONS

Ferreira da Silva et al., "Development of Skin-Foils With Embedded Optical Fiber Sensors", Semana de Engenharia 2010, 8 pages. <http://www3.dsi.uminho.pt/seeum2010/CD/artigos/alexandre_ferreira_da_silva-article.pdf>.

Bel, "Fiber Flex Optical Circuits", STRATOS Optical Technologies, downloaded from the Internet on May 27, 2022, 3 pages. <https://www.belfuse.com/product-detail/stratos-fiber-flex-optical-circuits>.

Bosboom et al., "Ribbon Tapes, Shape Sensors, and Hardware", Conference Paper—Sep. 2015, Conference: Smart Intelligent Aircraft Structures (SARISTU): Proceedings of the Final Project ConferenceAt: pp. 349-406 vol. Part IV. <https://www.researchgate.net/publication/283007572_Ribbon_Tapes_Shape_Sensors_and_Hardware>.

Long et al., "Stability of amorphous-Silicon TFTs deposited on clear plastic substrates at 250° C. to 280° C.", Article in IEEE Electron Device Letters, vol. 27, NP. 2, Feb. 2006, pp. 111-113.

General Wire Products, INC., "Comparison Chart of Typical Insulation Materials", downloaded on the Internet on May 27, 2022, 6 pages. <https://www.generalwireproducts.com/technical-data-2/comparison-chart-of-typical-insulation-materials/>.

TE connectivity, "High Density Versatile Optical Flex Circuit Cable Assemblies", downloaded on the Internet on May 27, 2022, 2 pages. <https://www.te.com/commerce/DocumentDelivery/DDEController?Action=srchrtrv&DocNm=1-1773940-9_optical-flex&DocType=DS&DocLang=EN>.

English summary of Office Action for China Application No. CN2022104051789, mailed Mar. 28, 2025, 14 pages.

Jun Deng et al., "Fire identification and linkage control", Safety Science and Engineering, China Machine Press, Dec. 2019, 13 pages with Machine English translation.

European Patent Office, "The examination report for European Application No. 24177475.1", dated Sep. 11, 2025, 7 pages.

European Patent Office, "The extended European Search report for Application No. EP 25172952.1-1001", dated Aug. 11, 2025, 11 pages.

Haifeng Dai, "Advance battery management strategies for a sustainable energy future: Multilayer design concepts and research trends", Renewable and Sustainable Energy Reviews, Elsevier Science, vol. 138, Oct. 29, 2020, 25 pages.

* cited by examiner

150

104

200

114

112

110

108

120

118

116

106

318

DTS

320

OPTICAL FIBER

FLAT SUPPORT PLATE

318

FIBER OPTIC

DTS

320

THERMAL STIMULUS

1300

RECEIVING, FROM A REMOTELY DISPOSED MONITORING DATA COLLECTOR THAT OBTAINS, FROM AN OPTICAL FIBER OF A SENSING MEMBRANE THAT IS USED TO MONITOR A THERMAL PROPERTY OF A DEVICE, MONITORING DATA ASSOCIATED WITH THE MONITORING OF THE THERMAL PROPERTY OF THE DEVICE
1302

FORWARDING, TO THE MONITORING DATA COLLECTOR AND BASED ON AN ANALYSIS OF THE MONITORING DATA, AN INDICATION OF AN OPERATIONAL STATUS OF THE DEVICE
1304

*FIG. 13*

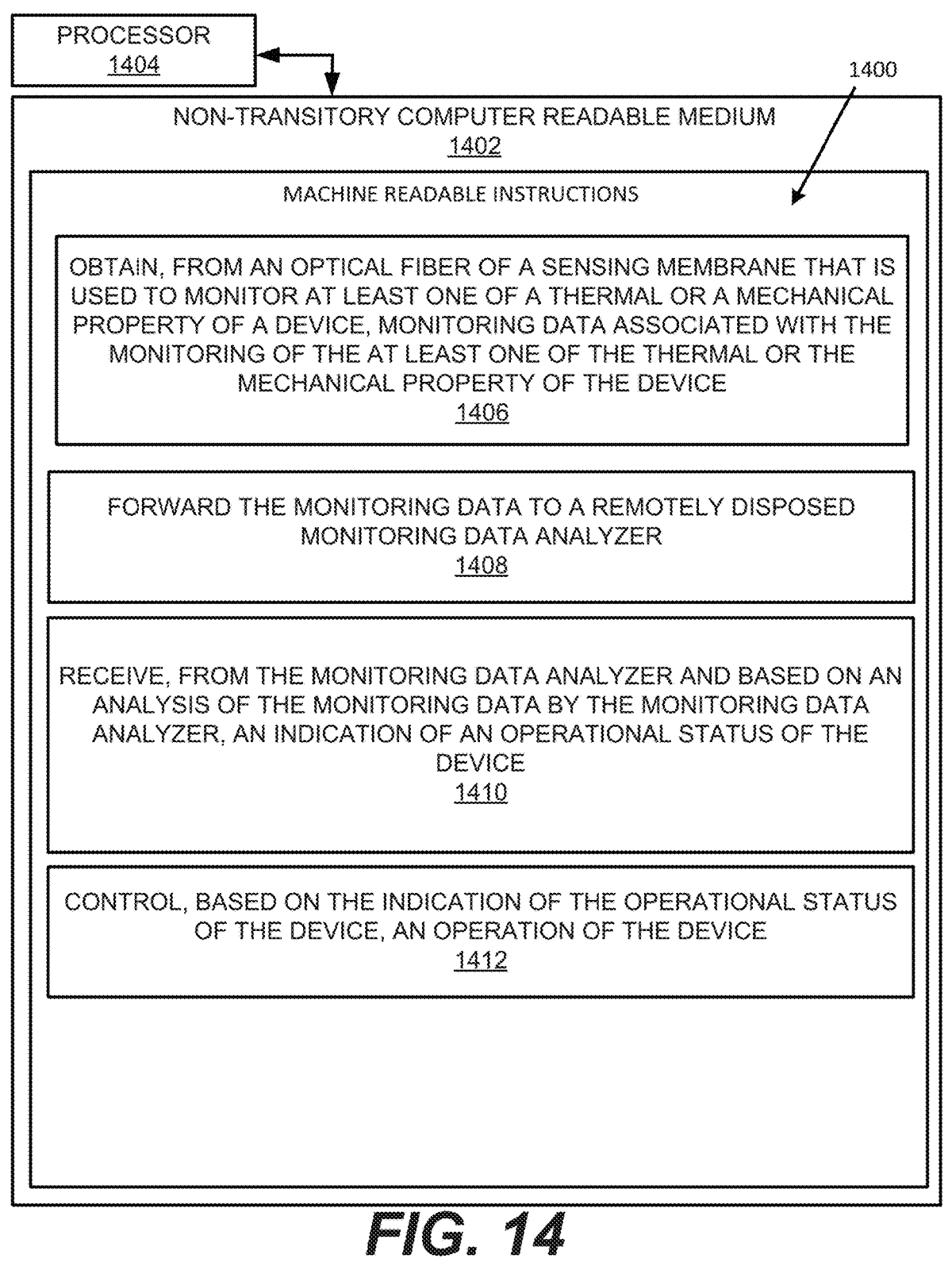

PROCESSOR
1404

1400

NON-TRANSITORY COMPUTER READABLE MEDIUM
1402

MACHINE READABLE INSTRUCTIONS

OBTAIN, FROM AN OPTICAL FIBER OF A SENSING MEMBRANE THAT IS USED TO MONITOR AT LEAST ONE OF A THERMAL OR A MECHANICAL PROPERTY OF A DEVICE, MONITORING DATA ASSOCIATED WITH THE MONITORING OF THE AT LEAST ONE OF THE THERMAL OR THE MECHANICAL PROPERTY OF THE DEVICE
1406

FORWARD THE MONITORING DATA TO A REMOTELY DISPOSED MONITORING DATA ANALYZER
1408

RECEIVE, FROM THE MONITORING DATA ANALYZER AND BASED ON AN ANALYSIS OF THE MONITORING DATA BY THE MONITORING DATA ANALYZER, AN INDICATION OF AN OPERATIONAL STATUS OF THE DEVICE
1410

CONTROL, BASED ON THE INDICATION OF THE OPERATIONAL STATUS OF THE DEVICE, AN OPERATION OF THE DEVICE
1412

*FIG. 14*

DATA COLLECTION AND ANALYSIS-BASED DEVICE MONITORING

PRIORITY

This application claims priority to commonly assigned and co-pending European Patent Application No. EP21305505.6, filed Apr. 16, 2021, titled "OPTICAL FIBER-BASED SENSING MEMBRANE LAYOUT", commonly assigned and co-pending European Patent Application No. EP21305506.4, filed Apr. 16, 2021, titled "OPTICAL FIBER-BASED SENSING MEMBRANE", and commonly assigned and co-pending European Patent Application No. EP21186792.4, filed Jul. 20, 2021, titled "DATA COLLECTION AND ANALYSIS-BASED DEVICE MONITORING", the disclosures of which are hereby incorporated by reference in their entireties.

BACKGROUND

Optical fibers may be utilized in various industries such as communications, medical, military, broadcast, etc., to transmit data and for other related applications. Examples of applications may include sensing of temperature, mechanical strain, and/or vibrations by utilizing an optical fiber. Data that is collected for such applications may need to be processed in an efficient manner to control operations related to a vehicle on which the temperature, mechanical strain, and/or vibrations are sensed, and/or to control operations related to other vehicles.

BRIEF DESCRIPTION OF DRAWINGS

Features of the present disclosure are illustrated by way of examples shown in the following figures. In the following figures, like numerals indicate like elements, in which:

FIG. 13 illustrates a flowchart of an example method for data collection and analysis-based device monitoring in accordance with an example of the present disclosure; and FIG. 14 illustrates a further example block diagram for data collection and analysis-based device monitoring in accordance with another example of the present disclosure.

DETAILED DESCRIPTION

Figure 1A:
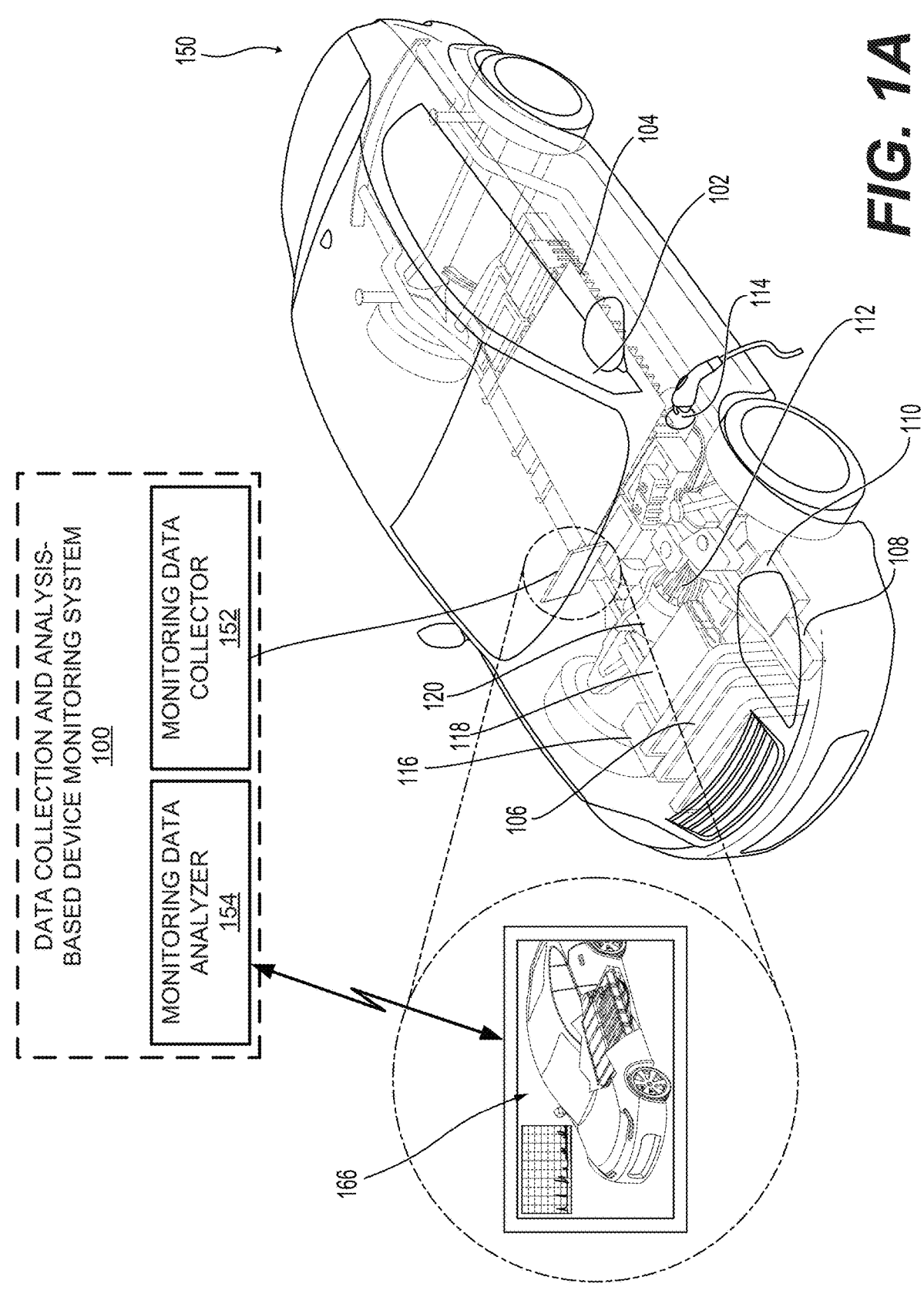
FIG. 1A illustrates an electric vehicle including a data collection and analysis-based device monitoring system, including an optical fiber-based sensing membrane, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Data collection and analysis-based device monitoring systems, methods for data collection and analysis-based device monitoring, and non-transitory computer readable media having stored thereon machine-readable instructions to provide data collection and analysis-based device monitoring are disclosed herein. The systems, methods, and non-transitory computer readable media disclosed herein provide for a monitoring data collector and a monitoring data analyzer that are physically separate from each other. The data collection and analysis-based device monitoring system may hereinafter be referred to as a "monitoring system".

With respect to the systems, methods, and non-transitory computer readable media disclosed herein, monitoring of devices, such as batteries for a vehicle, such as an electric, a hybrid vehicle, and other such vehicles, may be performed to maintain the devices in a safe operational state. For example, monitoring of electric vehicle batteries may need to be performed for potential issues before the issues hinder operation of the batteries. Electric vehicles and other such vehicles typically include limited space for sensors, data collection systems, and data analysis systems. In this regard, due to the increase in data monitoring requirements, it is technically challenging to integrate sensors, data collection systems, and data analysis systems in an electric vehicle. Moreover, it is technically challenging to integrate sensors, data collection systems, and data analysis systems that enable a plurality of electric vehicles to communicate with each other.

The systems, methods, and non-transitory computer readable media disclosed herein may address the aforementioned technical challenges by separating the monitoring data collector and the monitoring data analyzer from each other.

According to examples disclosed herein, the monitoring data collector may represent a dedicated device that includes the functionality of data collection. The monitoring data analyzer may include, but not limited to, the functionality of data processing and analysis.

According to examples disclosed herein, the monitoring data analyzer may communicate with the monitoring data collector, for example, using cellular signals, Wi-Fi signals, and other types of wireless connections.

According to examples disclosed herein, the data processing associated with the monitoring data collector and the monitoring data analyzer may be performed by using and sharing an existing embedded device in the electric vehicle.

According to examples disclosed herein, the systems, methods, and non-transitory computer readable media disclosed herein may provide for processing associated with the monitoring data collector to be performed at a location other than the electric vehicle. For example, the processing may be performed by the monitoring data analyzer at a Cloud, a central office, etc. Processed results may be intermittently or upon completion communicated back to an electric vehicle, or to a plurality of electric vehicles.

According to examples disclosed herein, the systems, methods, and non-transitory computer readable media disclosed herein may utilize a processor of an electric vehicle. For example, the processing performed by the monitoring data analyzer and associated with the monitoring data collector may be performed by utilizing a processor of an electric vehicle.

According to examples disclosed herein, one or multiple sensors may be used with a single monitoring data collector. In this regard, a sensor may include an optical fiber-based sensing membrane as disclosed herein.

According to examples disclosed herein, the systems, methods, and non-transitory computer readable media disclosed herein may be utilized for data monitoring associated with an optical fiber-based sensing membrane. The optical fiber-based sensing membrane may include at least one optical fiber, and a flexible substrate. The at least one optical fiber may be integrated in the flexible substrate. The flexible substrate may include a thickness and a material property that are specified to obtain, via the at least one optical fiber and for a device that is contiguously engaged with a surface of the flexible substrate, includes the flexible substrate embedded in the device, or includes the surface of the flexible substrate at a predetermined distance from the device, a thermal and/or a mechanical property associated with the device. Examples of mechanical properties may include strain, vibration, and other such properties. The device may include, for example, a battery pack of an electric vehicle, or any other type of flat or curved structure that is to be monitored. Yet further, the substrate may be flexible or rigid. For example, with respect to a surface application of the sensing membrane on a device or an embedded application of the sensing membrane in a device, the optical fiber may be embedded in a rigid sensing membrane formed of a rigid substrate. According to another example, with respect to an optical fiber integrated in a molded part of a device such as a battery pack, the optical fiber may be embedded in a rigid sensing membrane formed of a rigid substrate.

According to examples disclosed herein, the monitoring data collector may include an optical time-domain reflectometer (OTDR) to determine temperature and/or strain associated with a device. The OTDR may represent an optoelectronic instrument used to characterize an optical fiber, for example, of the data collection and analysis-based device monitoring system. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR include attenuation uniformity and attenuation rate, segment length, and location and insertion loss of connectors and splices.

The OTDR may be used to determine both Brillouin and Rayleigh traces for an optical fiber, for example, of the data collection and analysis-based device monitoring. In one example, in an initial acquisition, Brillouin frequency shift and Brillouin power may be used to implement an absolute referencing of a Rayleigh reference trace (or traces). The Rayleigh reference trace may represent a reference point for subsequent measurements of the Rayleigh frequency shift. In this regard, the absolute referencing of the Rayleigh reference trace (or traces) may then be used to determine temperature and/or strain associated with an optical fiber by using the Brillouin frequency shift and the Rayleigh frequency shift in subsequent acquisitions.

According to examples disclosed herein, the data collection and analysis-based device monitoring system may be utilized to determine, based on distributed measurement, temperature, strain, and/or vibrations associated with a device, such as a battery pack.

For the systems, methods, and non-transitory computer readable media disclosed herein, the elements of the systems, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

Figure 1B:
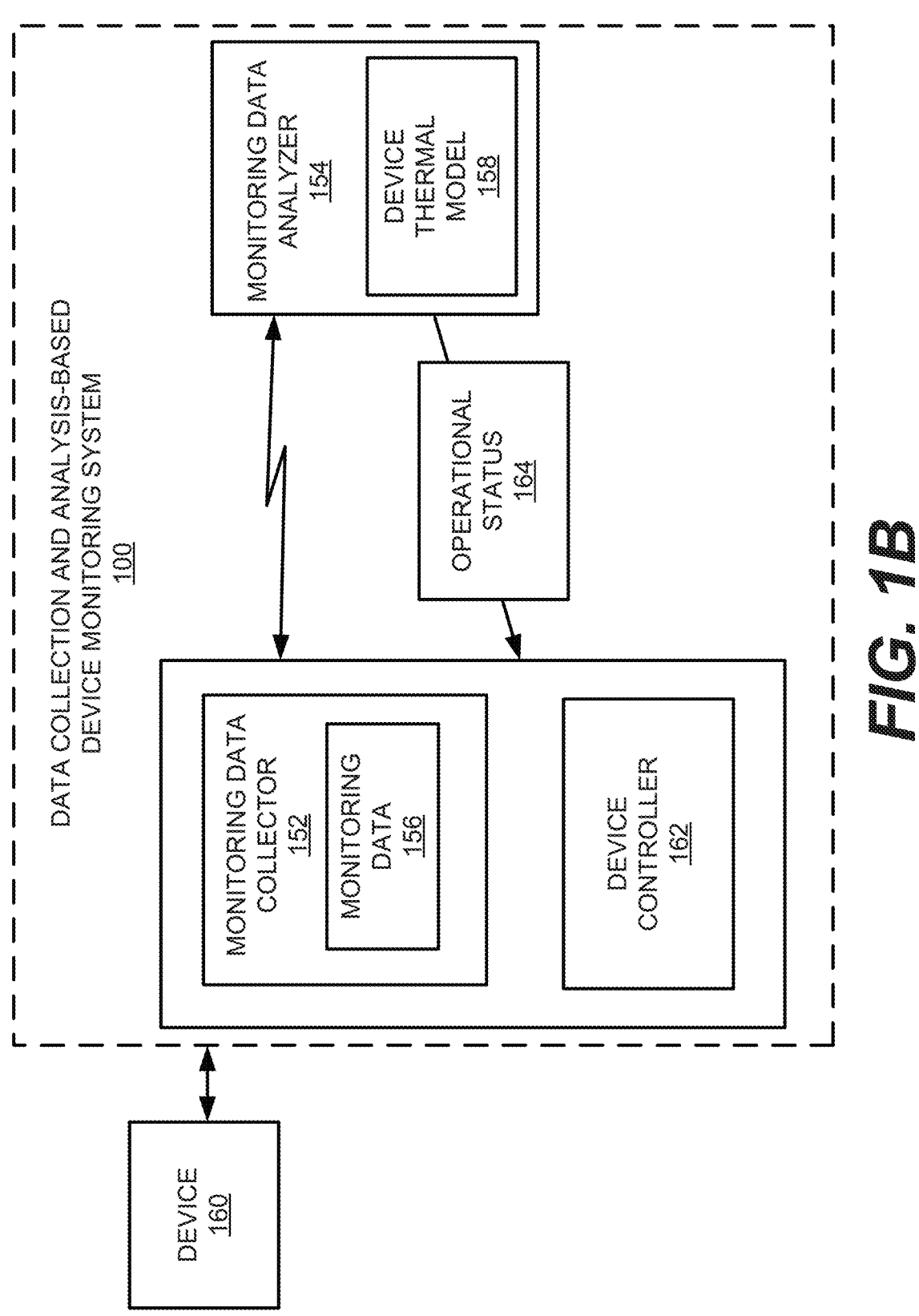
FIG. 1B illustrates further details of the data collection and analysis-based device monitoring system of FIG. 1A, according to an example of the present disclosure.

FIG. 1A illustrates a vehicle 150, which may include a hybrid vehicle (e.g., electric and non-electric combined), an electric vehicle, or other such vehicles, including a data collection and analysis-based device monitoring system 100 (hereinafter referred to as "monitoring system 100"), according to an example of the present disclosure. FIG. 1B illustrates further details of the monitoring system 100, according to an example of the present disclosure.

Referring to FIGS. 1A and 1B, the monitoring system 100 may include a monitoring data collector 152, and a monitoring data analyzer 154 to process monitoring data 156 collected by the monitoring data collector 152. Operations of the monitoring data collector 152 and the monitoring data analyzer 154 will be described in further detail with reference to FIG. 1B.

The vehicle 150 may include a sensing membrane 102 disposed on a device, such as a battery pack 104. The vehicle 150 may include other known components such as a thermal system 106 for cooling the vehicle, an auxiliary battery 108, an onboard battery charger 110, a vehicle transmission 112, a charge port 114 for the battery pack 104, a converter 116, a power electronics controller 118, and an electric traction motor 120.

FIG. 1B illustrates further details of the monitoring system 100, according to an example of the present disclosure.

Referring to FIG. 1B, the monitoring system 100 may include the monitoring data collector 152 that is executed by at least one hardware processor (e.g., the hardware processor 1202 of FIG. 12, and/or the hardware processor 1404 of FIG. 14) to obtain, from an optical fiber of the sensing membrane 102 that is used to monitor a thermal property of a device 160, monitoring data 156 associated with the monitoring of the thermal property of the device 160.

Figure 12:
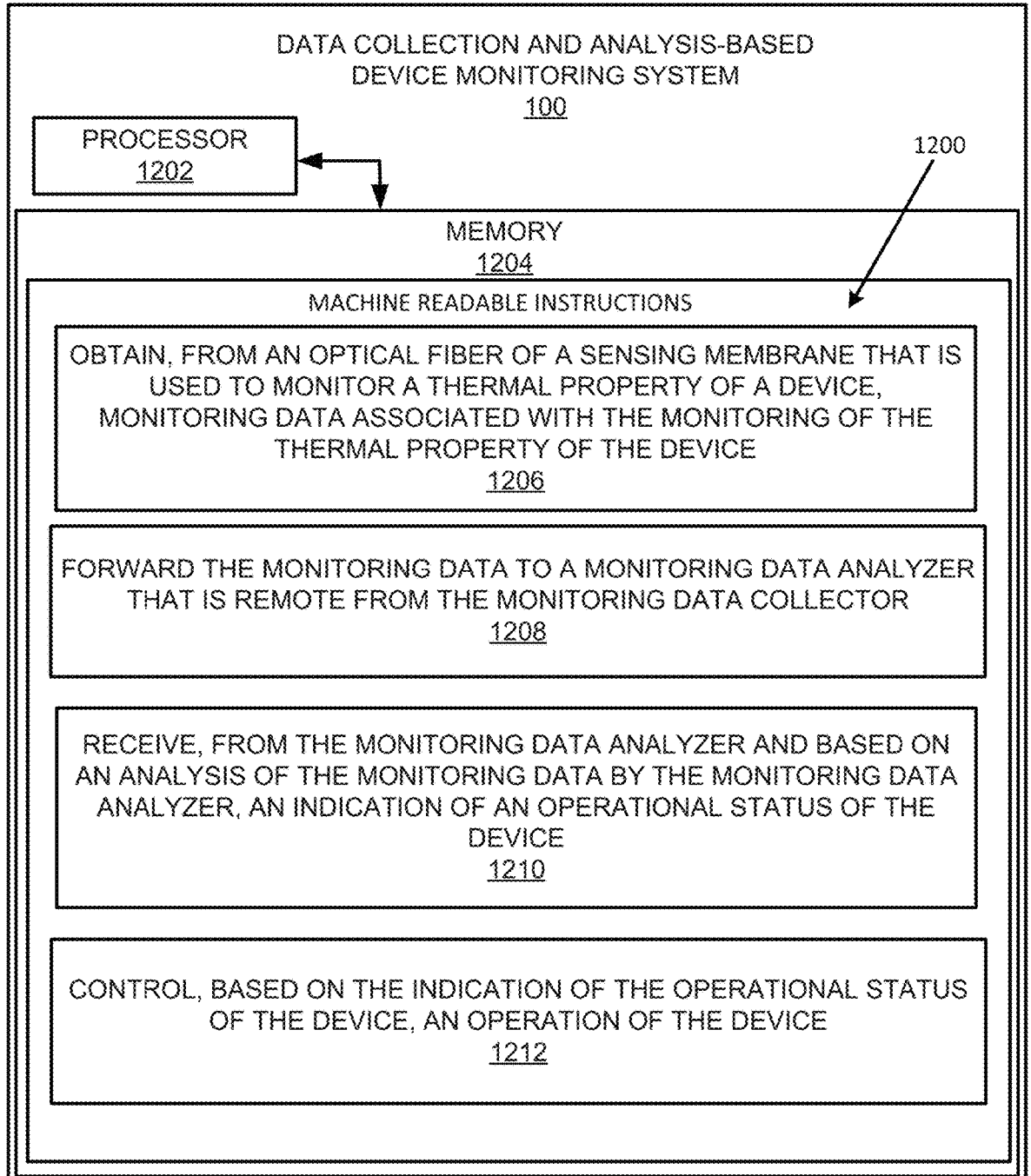
FIG. 12 illustrates an example block diagram for data collection and analysis-based device monitoring in accordance with an example of the present disclosure.

The monitoring data collector 152 may forward the monitoring data 156 to the monitoring data analyzer 154 that is executed by the at least one hardware processor (e.g., the hardware processor 1202 of FIG. 12, and/or the hardware processor 1404 of FIG. 14). The monitoring data analyzer 154 may be remote from the monitoring data collector 152. For example, the monitoring data analyzer 154 may be physically remote from the monitoring data collector 152.

The monitoring data collector 152 may receive, from monitoring data analyzer 154 and based on an analysis of the monitoring data 156 by the monitoring data analyzer 154, an indication of an operational status of the device 160.

A device controller 162 that is executed by the at least one hardware processor (e.g., the hardware processor 1202 of FIG. 12, and/or the hardware processor 1404 of FIG. 14) may control, based on the indication of the operational status 164 of the device 160, an operation of the device 160.

According to examples disclosed herein, the device 160 may include the battery pack 104 of the vehicle 150, which may include a hybrid vehicle (e.g., electric and non-electric combined), an electric vehicle, or other such vehicles.

According to examples disclosed herein, the monitoring data analyzer 154 may be implemented in a Cloud (e.g., cloud computing).

According to examples disclosed herein, the monitoring data analyzer 154 may be implemented at a remote geographic location that may be utilized to host servers and other such components to implement operation of the monitoring data analyzer 154.

According to examples disclosed herein, the sensing membrane 102 may include a generally planar configuration. For example, the sensing membrane 102 may include a planar configuration to match a configuration of a surface of the battery pack 104. In this regard, the flexibility of the sensing membrane 102 may facilitate conformance of the sensing membrane 102 to variations in the surface of the battery pack 104.

According to examples disclosed herein, the device controller 162 may control, based on the indication of the operational status of the device 160, the operation of the device 160 to disengage a flow of electricity to and/or from the device 160.

According to examples disclosed herein, the device controller 162 may control, based on the indication of the operational status 164 of the device 160, an operation of the device 160 by generating, based on the indication of the operational status 164 of the device 160, a notification associated with the operational status 164 of the device 160. The notification may include an alarm or another type of message to a user of the vehicle 150 or to remote authorized personnel that is monitoring operation of the vehicle 150. For example, as shown in FIG. 1A, the notification may be displayed on a user-interface display 166 of the monitoring data collector 152.

According to examples disclosed herein, the monitoring data collector 152 may forward, via a Wi-Fi signal, the monitoring data 156 to the monitoring data analyzer 154 that is remote from the monitoring data collector 152.

According to examples disclosed herein, the monitoring data collector 152 may forward, via a cellular signal, the monitoring data 156 to the monitoring data analyzer 154 that is remote from the monitoring data collector 152.

According to examples disclosed herein, the monitoring data analyzer 154 may receive, from the remotely disposed monitoring data collector 152 that obtains, from an optical fiber of the sensing membrane 102 that is used to monitor a thermal and/or mechanical property of the device 160, monitoring data 156 associated with the monitoring of the thermal and/or mechanical property of the device 160. The monitoring data analyzer 154 may forward, to the monitoring data collector 152 and based on an analysis of the monitoring data 156, an indication of the operational status 164 of the device 160. The indication of the operational status 164 of the device 160 may be used to control an operation of the device 160, for example, by shutting off electricity to the device 160, controlling a flow of electricity to the device 160, etc.

Figure 2:
FIG. 2 illustrates the electric vehicle of FIG. 1A, with the optical fiber-based sensing membrane removed, according to an example of the present disclosure.

FIG. 2 illustrates the vehicle 150 of FIG. 1A, with the monitoring system 100 and the sensing membrane 102 removed, according to an example of the present disclosure.

Referring to FIG. 2, the battery pack 104 is shown with the sensing membrane 102 removed. In this regard, the battery pack 104 may include, as shown, a plurality of battery cells 200. The sensing membrane 102 may be configured to sense thermal and/or strain variations, and/or vibrations associated with one, a few, or all of the battery cells 200 of the battery pack 104.

Figure 3:
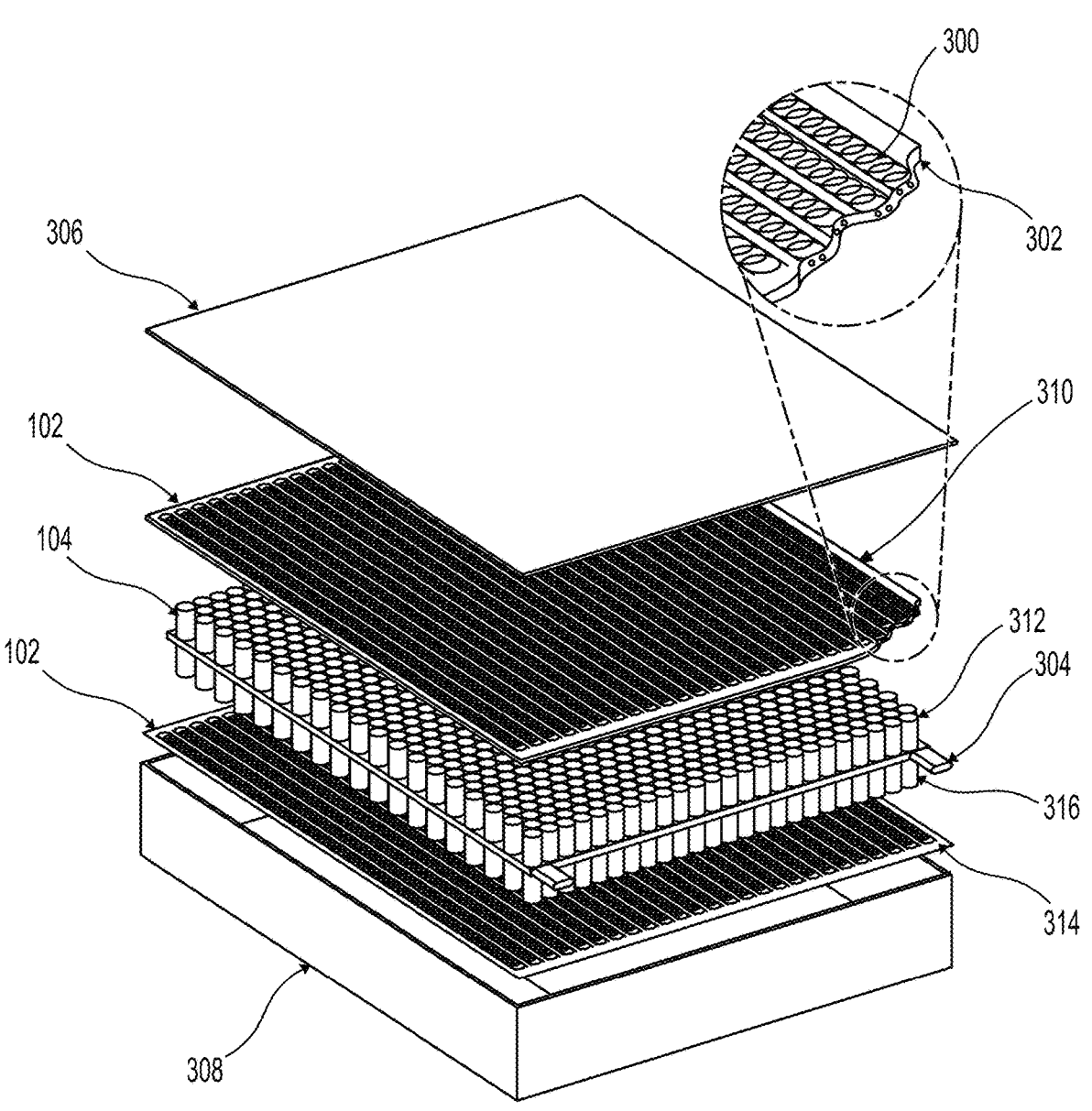
FIG. 3 illustrates a diagrammatic view illustrating the optical fiber-based sensing membrane of FIG. 1A in use, according to an example of the present disclosure.
Figure 3:
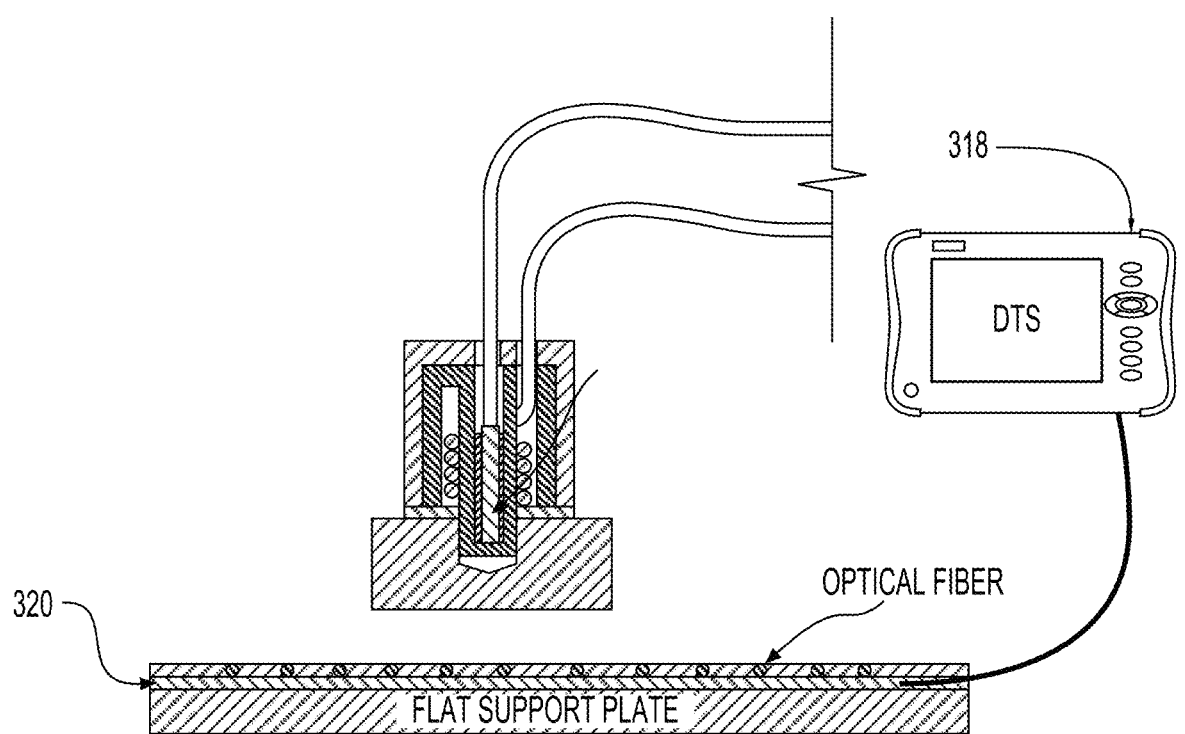
Figure 3:
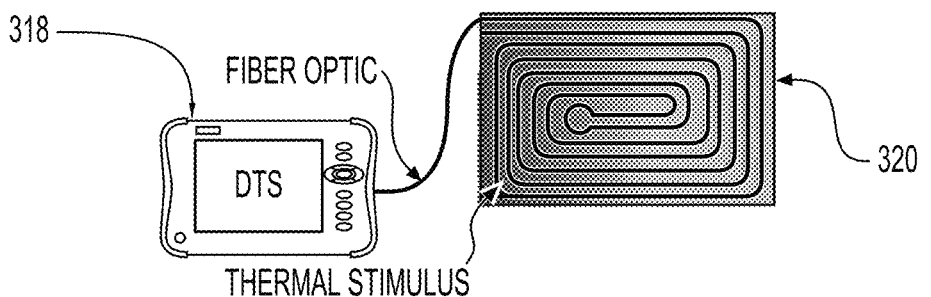

FIG. 3 illustrates a diagrammatic view illustrating the optical fiber-based sensing membrane 102 in use, according to an example of the present disclosure.

Referring to FIG. 3, the optical fiber-based sensing membrane 102 may include at least one optical fiber integrated in an adhesive substrate. In the example of FIG. 3, as shown in the enlarged view, a plurality of optical fibers 300 may be integrated in an adhesive substrate 302.

In the example of FIG. 3, sensing membranes may be disposed on upper and lower surfaces of the battery pack 104 in the orientation of FIG. 3. The battery pack 104 may include a plurality of battery cells. The battery cells may include, in the example shown, a cooling system 304 between upper and lower sets of battery cells in the orientation of FIG. 3. The upper and lower sensing membranes, and the battery pack 104 may be enclosed in an enclosure, with upper and lower layers 306 and 308 of the enclosure shown in the orientation of FIG. 3.

For the example of FIG. 3, the sensing membrane 102 at 310 may be used to sense thermal and/or strain variations, and/or vibrations of upper battery cells at 312, and the sensing membrane 102 at 314 may be used to sense thermal and/or strain variations, and/or vibrations of lower battery cells at 316.

The adhesive substrate may include Polyimide, or another such material. The Polyimide material may provide the requisite durability with respect to vibrations associated with the battery pack 104 and/or other components that may be engaged with the sensing membrane 102. Similarly, the Polyimide material may provide the requisite durability with respect to temperature variations associated with the battery pack 104 and/or other components, which may be on the order of −40° C. to 140° C., or include a greater range than −40° C. to 140° C. Further, the Polyimide material may provide the requisite flexibility associated with surface variations associated with the battery pack 104 and/or other components that may be engaged with the sensing membrane 102. The Polyimide material may also be transparent, and thus provide sufficient transmission of light into the optical fiber for detection of light or an anomaly (e.g., a high temperature event) associated with the battery pack 104.

The sensing membrane 102 may be of a light weight (e.g., 200-500 g/m²). In this regard, the sensing membrane 102 may add minimal weight with respect to the device being monitored for thermal and/or strain variations, and/or vibrations.

The sensing membrane 102 may be approximately 0.5 mm, to thus minimize integration challenges with respect to the device being monitored for thermal and/or strain variations, and/or vibrations. In this regard, the optical fibers embedded in the sensing membrane 102 may be on the order of 0.25 mm in thickness. For the geometric patterns of optical fibers that include optical fiber crossings, such optical fibers may be treated after the sensing membrane is assembled, for example, by a combined action of pressure and temperature above the melting point of the optical fiber coating while the sensing membrane material is unaffected. Thus, the overall thickness of 0.5 mm may thus add minimal thickness associated with the battery pack 104.

With continued reference to FIG. 3, one example of a test set-up to evaluate performances of distributed temperature sensing systems based on distributed temperature sensing interrogator (DTS) 318 (also referred to herein as distributed temperature sensor) and fiber sensing membrane 320 is shown, and may be utilized to sense temperature, but also strain variations using a distributed strain sensing interrogator in place of the DTS. In this regard, the distributed temperature sensing interrogator 318, which may include an OTDR, may be utilized with the various examples of the sensing membrane 102 as disclosed herein.

Figure 4:
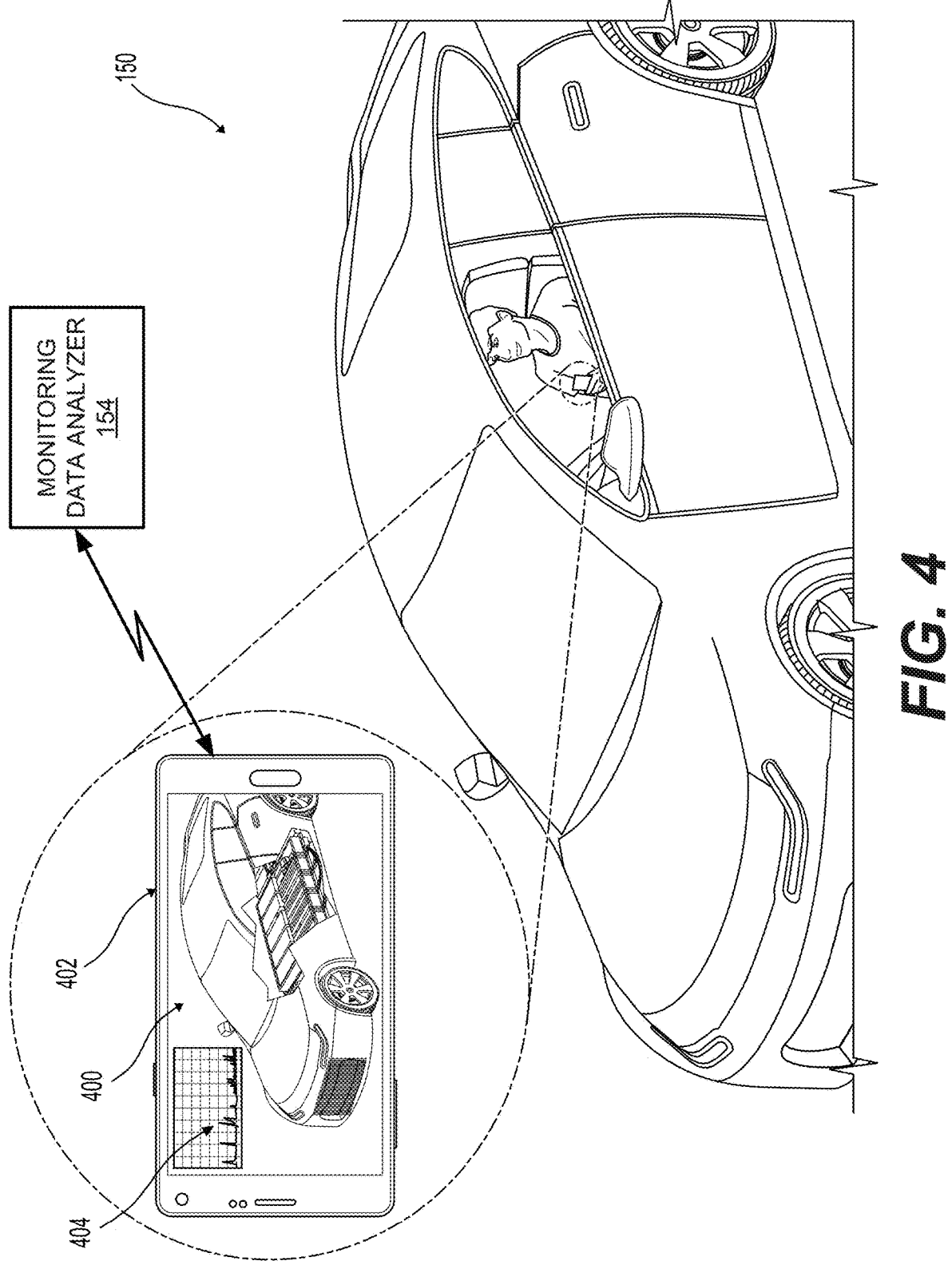
FIG. 4 illustrates a diagrammatic view illustrating a user-interface display associated with the data collection and analysis-based device monitoring system of FIG. 1A, according to an example of the present disclosure.

FIG. 4 illustrates a diagrammatic view illustrating a user-interface display associated with the monitoring system 100, according to an example of the present disclosure.

Referring to FIG. 4, as disclosed herein, the monitoring system 100 may include the monitoring data analyzer 154. In this regard, the monitoring data analyzer 154 may generate, via a user interface display 400 on a smart device 402, a display of an operational status of the battery pack 104. For example, the display 400 may include a display of the vehicle 150, a cutout display of the battery pack 104, and a graphical display 404 of an operational temperature associated with one, a selected few, or all battery cells of the battery pack 104.

Figure 5:
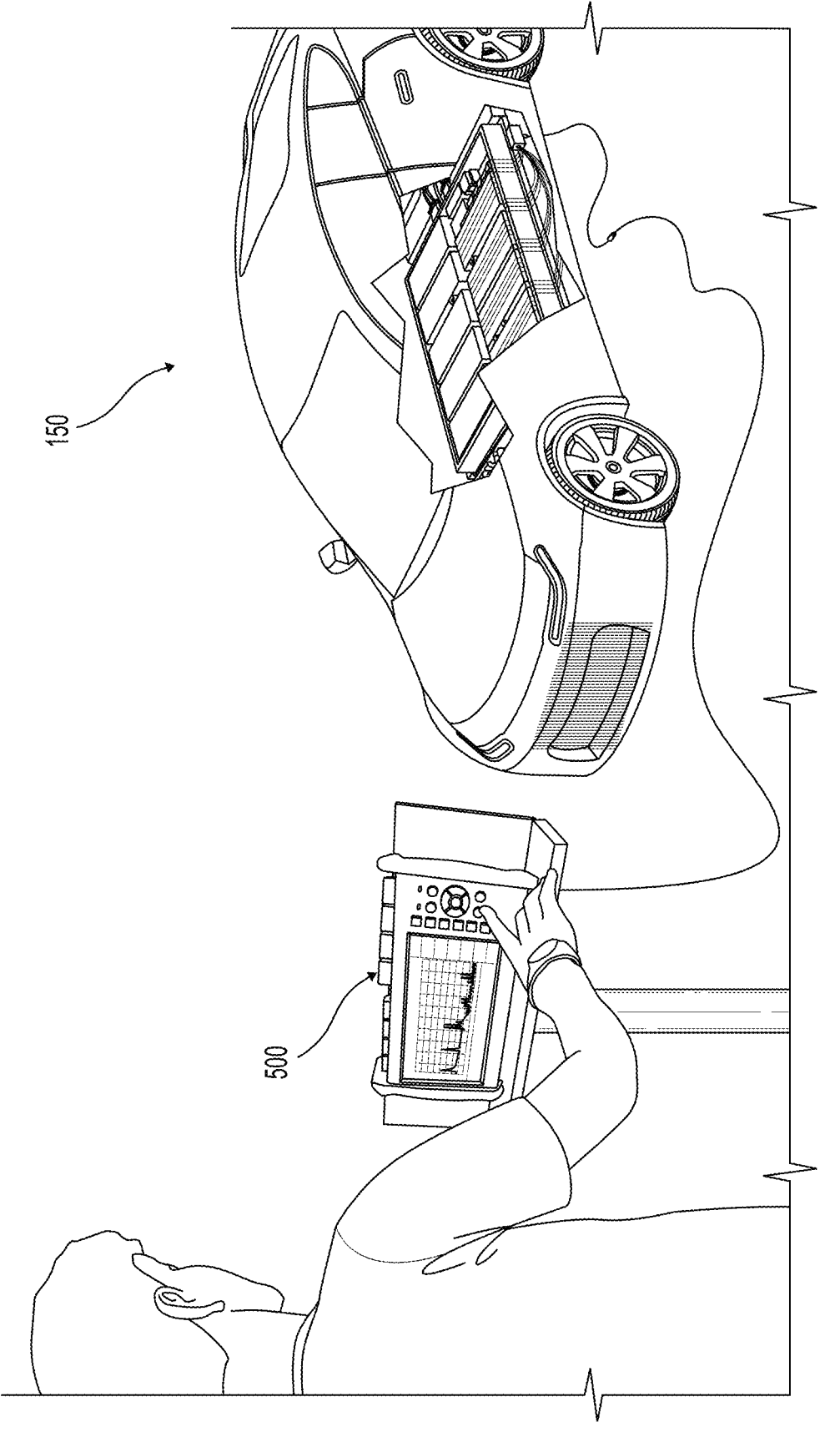
FIG. 5 illustrates a diagrammatic view illustrating a monitoring display associated with the data collection and analysis-based device monitoring system of FIG. 1A, according to an example of the present disclosure.

FIG. 5 illustrates a diagrammatic view illustrating a monitoring display associated with the monitoring system 100, according to an example of the present disclosure.

Referring to FIG. 5, the monitoring data collector 152 may include an optical time-domain reflectometer (OTDR) to determine temperature and/or strain associated with the device 160. For the examples of FIGS. 1A-5, the device may include the battery pack 104. The OTDR may represent an optoelectronic instrument used to characterize an optical fiber, for example, of the sensing membrane 102. The OTDR may inject a series of optical pulses into an optical fiber under test (e.g., an optical fiber of the sensing membrane 102). Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR include attenuation uniformity and attenuation rate, segment length, and location and insertion loss of connectors and splices.

For the example of FIG. 5, a device 500, which may be an OTDR or another type of display device, may be operatively connected to the battery pack 104 to measure and/or display an operational temperature associated with one, a selected few, or all battery cells of the battery pack 104.

Figure 6A:
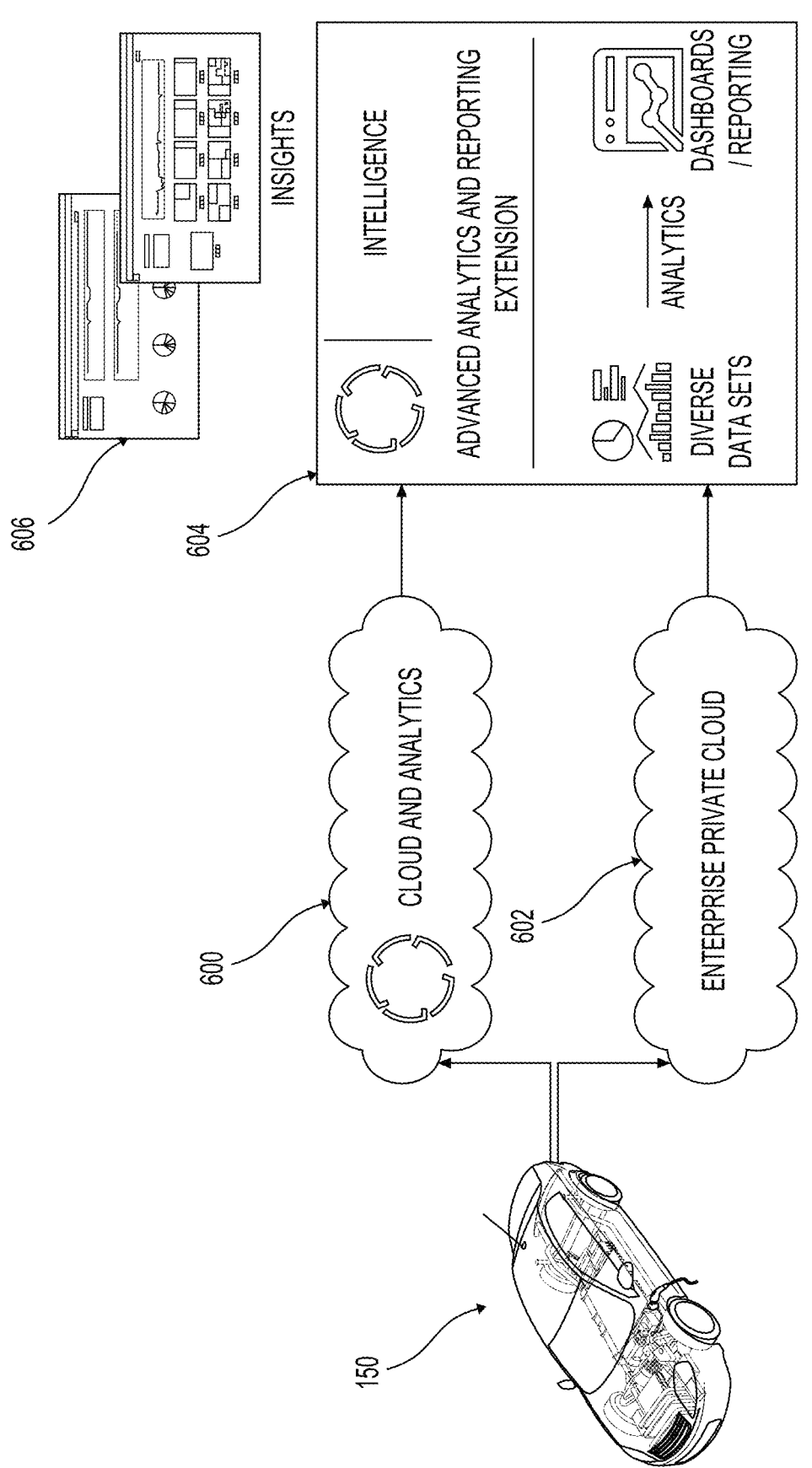
FIG. 6A illustrates Cloud and analytics to illustrate operation of the data collection and analysis-based device monitoring system of FIG. 1A, with respect to a single vehicle, according to an example of the present disclosure.

FIG. 6A illustrates Cloud and analytics to illustrate operation of the monitoring system 100, with respect to a single vehicle, according to an example of the present disclosure.

Referring to FIGS. 1B and 6A, as disclosed herein, monitoring data 156 may be sent from the monitoring data collector 152 to the monitoring data analyzer 154. In this regard, the monitoring data analyzer 154 may be implemented, for example, in a Cloud environment 600 to perform analytics on the monitoring data 156. The monitoring data 156 may be sent to the Cloud environment 600, and/or to an enterprise private Cloud 602 for additional security. At the Cloud environment 600 and/or the enterprise private Cloud 602, analytics may be performed at 604 with respect to an operational status of the battery pack 104 to generate insights 606 such as battery temperature, battery remaining life, operational condition (e.g., proper, improper, etc.), etc. The insights 606 may be displayed in a display, such as the display 404 of FIG. 4. With respect to the insights 606, battery remaining life may be determined based on the measured voltage of the battery pack 104, and a coulomb counter that measures the current taken or delivered to the battery pack 104. Knowing the battery chemistry and behavior, the operational condition and health of the battery pack 104 may be determined based on the sensor membrane 102 and other inputs.

The monitoring data 156 may be uploaded to the Cloud in real-time (e.g., as any change in data occurs), or at pre-set intervals (e.g., every 2 seconds, 10 seconds, 30 seconds, etc.). In this regard, processing resources in the Cloud may also be conserved.

Figure 6B:
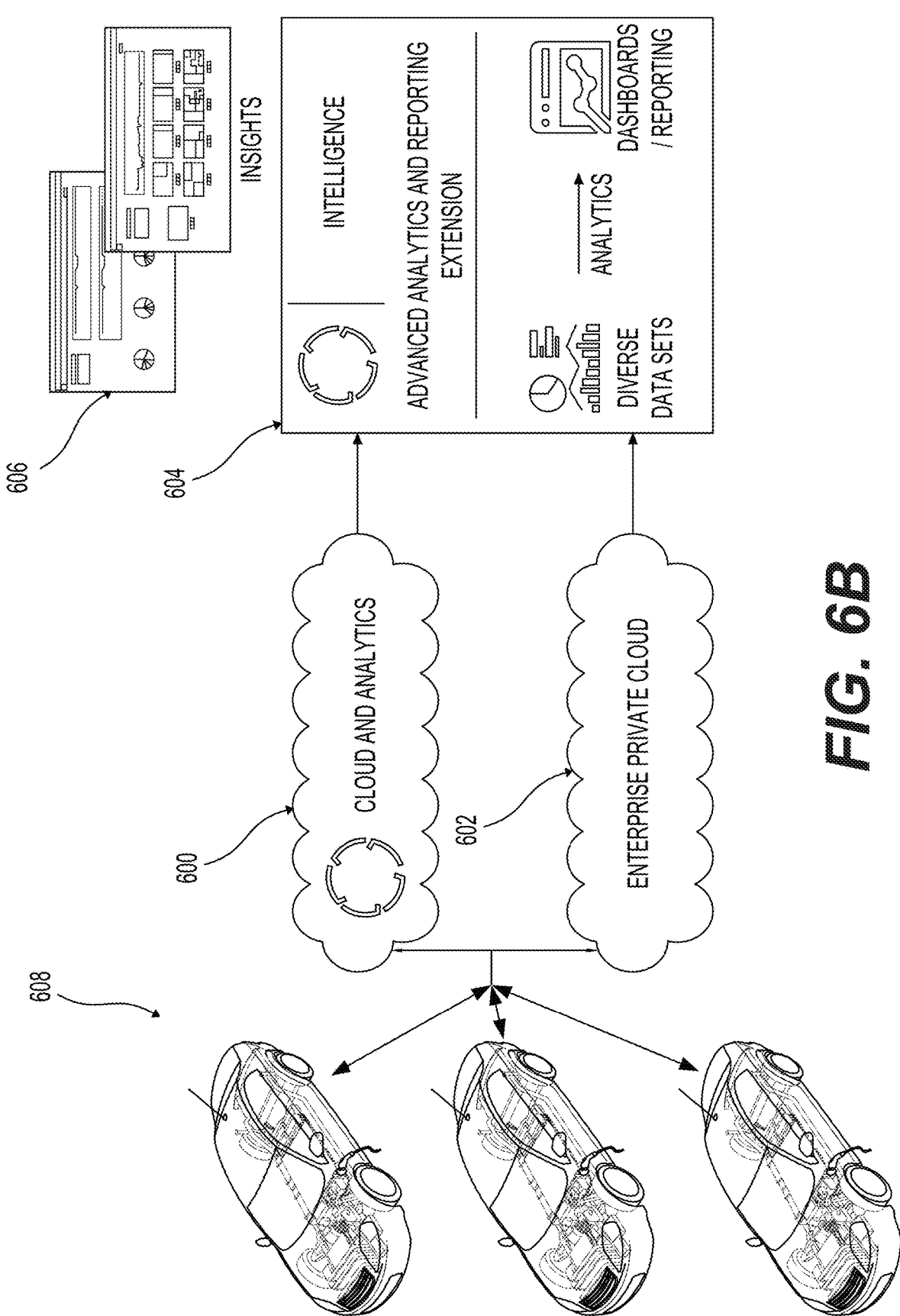
FIG. 6B illustrates Cloud and analytics to illustrate operation of the data collection and analysis-based device monitoring system of FIG. 1A, with respect to multiple vehicles, according to an example of the present disclosure.

FIG. 6B illustrates Cloud and analytics to illustrate operation of the monitoring system 100, with respect to multiple vehicles, according to an example of the present disclosure.

Referring to FIG. 6B, with respect to multiple vehicles as shown at 608, the monitoring data 156 may be collected from several vehicles to determine trends, anomalies, etc., associated with operation of the battery pack 104. In this regard, if a status of a battery pack 104 on a specified vehicle indicates a potential anomaly due to a particular event, a notification of such an event may be relayed to other vehicles to prevent the occurrence of the anomaly in the other vehicles. With respect to determination of events related to multiple vehicles, if through monitoring the battery pack 104, it is determined that a particular event precedes a more general failure, monitoring for that event may be used to predict failure in all other batteries packs for multiple vehicles. An example may include battery cell voltages. If a change in a battery cell voltage of a particular battery pack had been previously observed on a vehicle and in that instance, it led to a cascaded failure of other battery cells and/or battery packs, then if in monitoring multiple vehicles, the information to look at a particular battery cell and/or battery pack may be used to prevent future cascaded failures.

Figure 7:
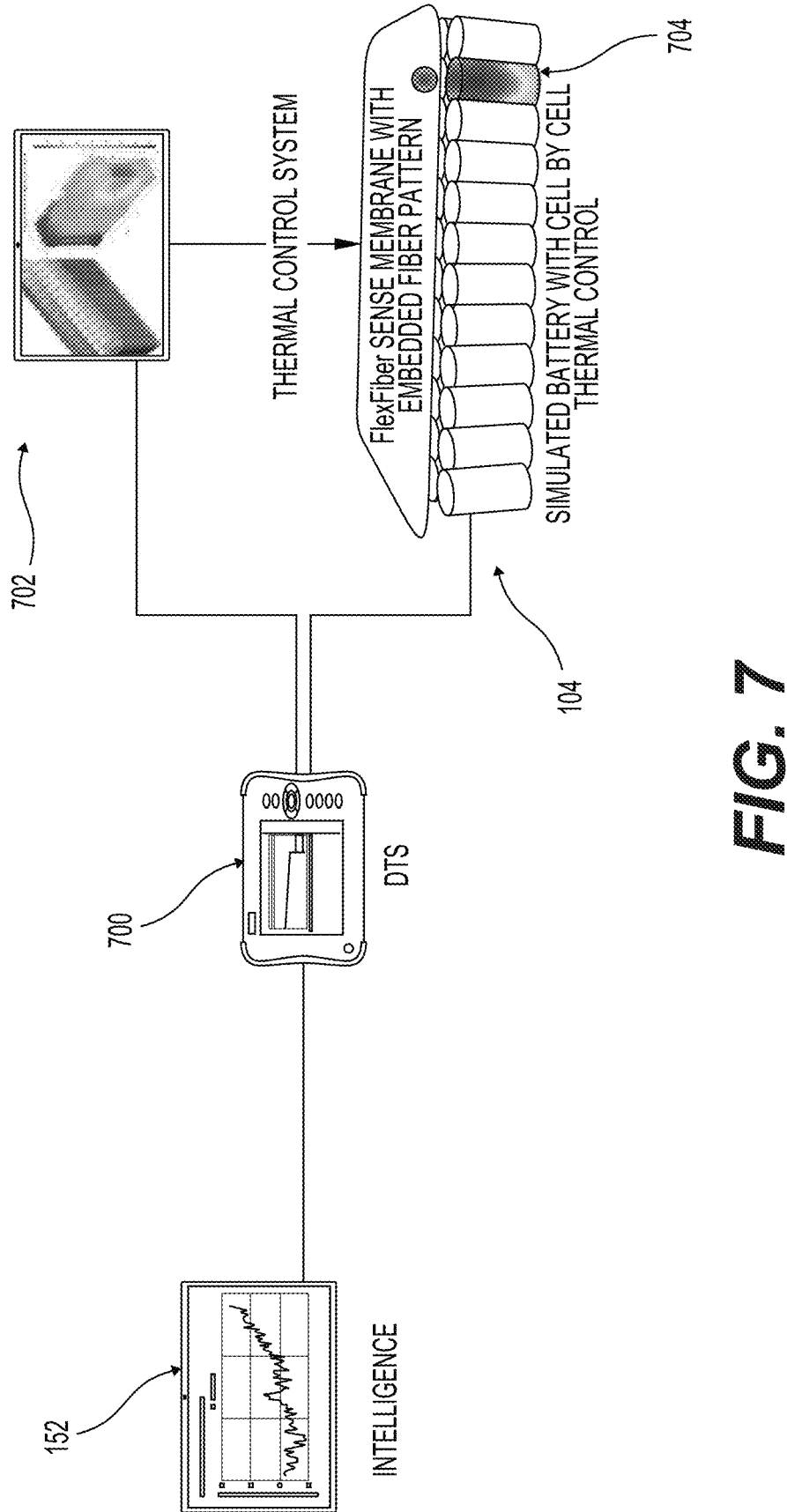
FIG. 7 illustrates a distributed temperature sensing interrogator (DTS) to illustrate operation of the data collection and analysis-based device monitoring system of FIG. 1A, according to an example of the present disclosure.

FIG. 7 illustrates a distributed temperature sensing interrogator (DTS) to illustrate operation of the monitoring system 100, according to an example of the present disclosure.

Referring to FIG. 7, for the example of FIG. 7, the monitoring data collector 152 may include a display, similar to display 404 of FIG. 4. In this regard, intelligence relayed from the monitoring data analyzer 154 to the monitoring data collector 152 may include a display of various insights 606 such as battery temperature, remaining life, operational condition, etc. In this regard, the OTDR functionality of the monitoring data collector 152 is depicted as a distributed temperature sensing interrogator (DTS) 700. The DTS 700 may determine thermal conditions of battery cells of the battery pack 104. A thermal control system 702 may control operation of the battery cells of the battery pack 104, for example, by disconnecting power to/from a specified battery cell (e.g., battery cell 704) that may be identified as a cell that may potentially experience an anomaly (e.g., high temperature, failure, etc.).

Figure 8:
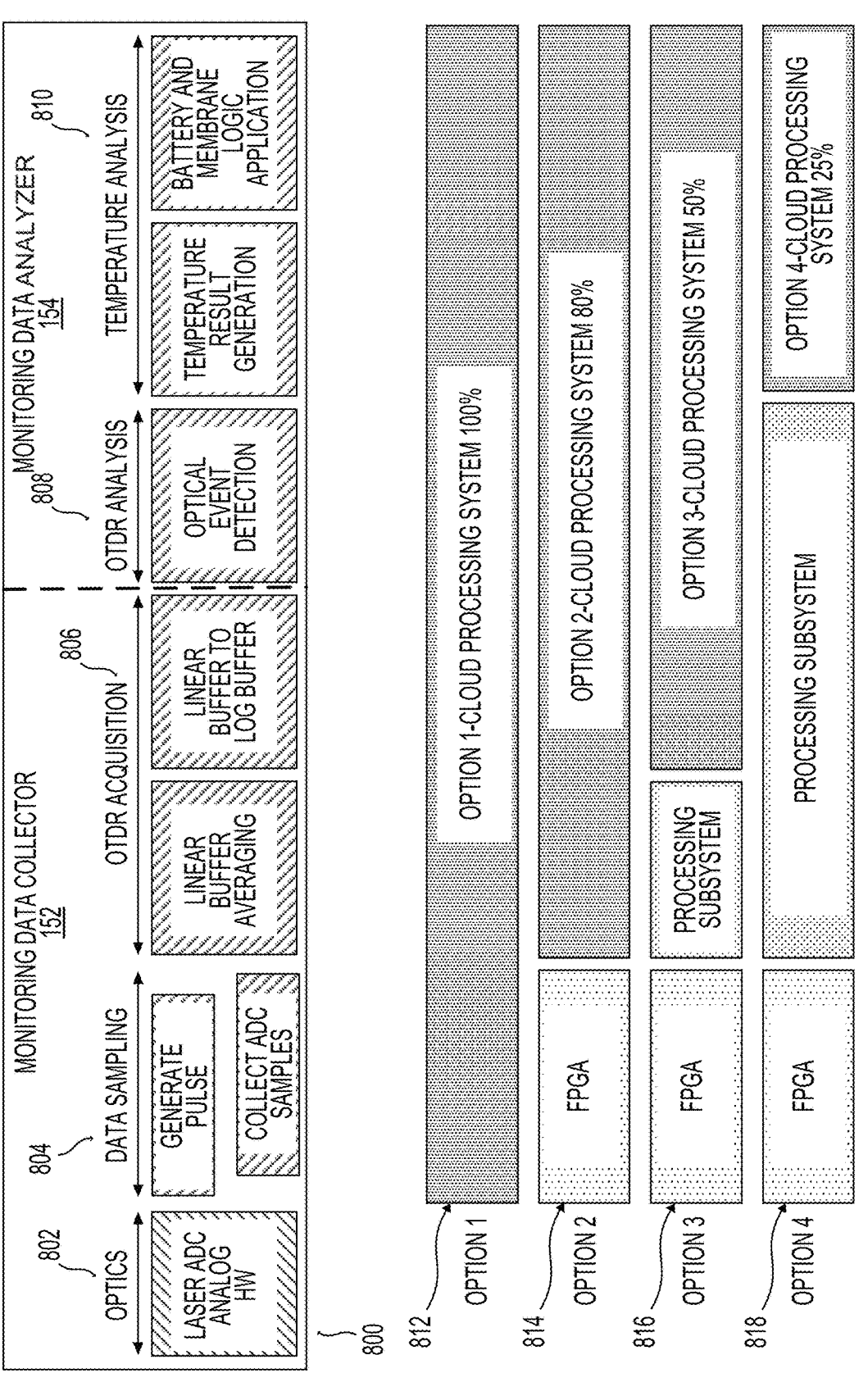
FIG. 8 illustrates distributed data processing to illustrate operation of the data collection and analysis-based device monitoring system of FIG. 1A, according to an example of the present disclosure.

FIG. 8 illustrates distributed data processing to illustrate operation of the monitoring system 100, according to an example of the present disclosure.

Referring to FIG. 8, distributed data processing with respect to the monitoring system 100 may be implemented to include optics 802, data sampling 804, and OTDR acquisition 806, which are part of the monitoring data collector 152. The optics 802 may include a laser to inject a series of optical pulses into an optical fiber under test (e.g., an optical fiber of the sensing membrane 102), associated analog-to-digital converter hardware, and related components. The data sampling 804 may include pulse generation and collection of analog-to-digital converter samples. The OTDR acquisition 806 may include linear buffer averaging, and a linear buffer to log buffer.

Further, the distributed data processing with respect to the monitoring system 100 may be implemented to include OTDR analysis 808 and temperature analysis 810, which are part of the monitoring data analyzer 154. The OTDR analysis 808 may include optical event detection with respect to the optical fiber under test (e.g., an optical fiber of the sensing membrane 102). The temperature analysis 810 may include temperature result generation, and battery and sensing membrane logic application. An example of the battery and sensing membrane logic application may include determining the temperature and decreasing the battery charging, inhibit charging, or reducing current drawn from the battery.

With respect to the distributed data processing, a single OTDR acquisition 806 may be performed for a corresponding OTDR analysis 808 and the temperature analysis 810.

Alternatively, a plurality of OTDR acquisitions may be performed for a single OTDR analysis 808 and temperature analysis 810 for all of the plurality of OTDR acquisitions. In this manner, processing resources may be conserved with respect to multiple OTDR acquisitions. For example, an OTDR analysis 808 and temperature analysis 810 may be performed for a plurality of OTDR acquisitions that include a specified number of acquisitions, or a number of acquisitions performed within a specified time interval, to determine trends associated with the OTDR acquisitions.

The separation of the OTDR acquisition 806 from the OTDR analysis 808 and the temperature analysis 810 may add additional security to monitoring of thermal events associated with the battery pack 104. For example, in the event of damage to one or more acquisition features of the monitoring system 100, the monitoring data analyzer 154 may still continue to process monitoring data 156 collected by the monitoring data collector 152.

The separation of the OTDR acquisition 806 from the OTDR analysis 808 and the temperature analysis 810 may enable the collection of the monitoring data 156 from a plurality of vehicles. For example, the monitoring data 156 may be collected from several vehicles for performance on analysis to determine trends, anomalies, etc., associated with operation of the battery pack 104. In this regard, if a status of a battery pack 104 on a specified vehicle indicates a potential anomaly due to a particular event, a notification of such an event may be relayed to other vehicles to prevent the occurrence of the anomaly in the other vehicles. Based on the separation of the OTDR acquisition 806 from the OTDR analysis 808, the separation may alleviate the analysis load from the vehicle, and thus result in faster data analysis. A remote analysis device for the OTDR analysis 808 may also utilize a solution such as the VIAVI NITRO BI solution to analyze large datasets to reveal trends.

The monitoring data analyzer 154 may process the monitoring data 156 collected by the monitoring data collector 152 to generate a device thermal model 158. The device thermal model 158 may be may be generated from various parameters such as interior/exterior temperature, vehicle and/or battery size, vehicle and/or battery type, vehicle speed, vehicle acceleration, altitude, vehicle and/or battery age, etc. The device thermal model 158 may be implemented based on machine learning (ML), artificial intelligence (AI), and other such techniques to generate a comprehensive model associated with the device 160, such as the battery pack 104. In this regard, the monitoring data 156 may be used to continuously update the device thermal model 158, as well as to utilize the device thermal model 158 to predict trends and anomalies associated with the device 160. Moreover, the separation of the monitoring data collector 152 and the monitoring data analyzer 154, and implementation of the monitoring data analyzer 154 external to a vehicle may enable utilization of virtually unlimited processing resources, compared to processing resources provided on a vehicle.

The monitoring data collector 152 may communicate with the monitoring data analyzer 154, and vice-versa, using, for example, Wi-Fi, Long Term Evolution (LTE), cellular generally, and other such protocols. The type of communication interface may be selected based on cost tradeoffs versus range and bandwidth requirements.

If an anomaly (e.g., high temperature, battery degradation, etc.) is detected, the monitoring data analyzer 154 may communicate an operational status 164 of the battery pack 104 with the monitoring data collector 152 or another system of the vehicle 150. For example, the operational status 164 of the battery back 104 may be communicated with the monitoring data collector 152 or a central control unit of the vehicle 150. In this regard, the monitoring data collector 152 or the central control unit may generate an audio, visual, vibration, or another type of notification to alert a user of the vehicle 150 of the need to perform maintenance or other activities on the vehicle 150. The operational status 164 of the battery pack 104 may include various parameters such as remaining battery life, battery temperature, battery operational status, etc. The operational status 164 of the battery pack 104 may be determined, for example, by utilizing AI and ML algorithms to correlate monitoring data 156 from a plurality of vehicles to determine trends that may be used to determine a value associated with the aforementioned parameters. For example, the status of the battery pack 104 to generate alarms/notifications may be determined based on thresholds for temperature of the battery pack 104, and determining, based on the thresholds, whether the battery pack 104 can still be used or the usage of the battery pack 104 may need to be modified based on a measured temperature. Since the measurement with the sensing membrane 102 is distributed, only parts of the battery pack 104 may need for usage to be adjusted if the temperatures are too high. For example, a plurality of thresholds may be specified to perform different adjustments to the battery pack 104 (e.g., threshold-1<region temperature<threshold-2, reduce battery pack usage for corresponding region by 10%, threshold-2<region temperature<threshold-3, reduce battery pack usage for corresponding region by 20% (where threshold-2 is greater than threshold-1), threshold-2<region temperature<threshold-3, shut down corresponding region of battery pack (where threshold-3 is greater than threshold-2), etc.).

The separation of the collection functionality implemented by the OTDR acquisition 806, and the analysis functionality implemented by the OTDR analysis 808 and temperature analysis 810 may be proportioned as shown at 812, 814, 816, and 818. In this regard, the proportioning may be implemented in a fixed or variable manner (e.g., changeable). For example, at 812, all of the analysis may be performed in a Cloud, whereas at 814, 816, and 818, the analysis in the Cloud may be reduced to 80%, 50%, and 25%, respectively, with the remaining analysis being performed using a processor available on the vehicle 150, or by another field-programmable gate array (FPGA).

The separation of the collection functionality implemented by the OTDR acquisition 806, and the analysis functionality implemented by the OTDR analysis 808 and temperature analysis 810 may be used to combine other types of analysis related to the vehicle 150. For example, the monitoring data 156 with respect to the battery pack 104, as well as other types of monitoring data associated with other systems and/or components of the vehicle 150 may be combined for analysis by the monitoring data analyzer 154. In this regard, the monitoring data analyzer 154 may perform analytics on monitoring data related, for example, to vehicle speed, vehicle and/or battery temperature, time, pressure, altitude, etc., from several vehicle systems and/or components, to perform analytics on all of the vehicle systems and/or components. Thus the results generated by the monitoring data analyzer 154 may be applied to various other systems and/or components of the vehicle 150.

With respect to factors that may be considered for utilizing an FPGA versus the Cloud, for data that requires all vehicle processing, data that includes a risk of sample collection timing and/or collection speed, such processing may utilize an FPGA. Other types of analysis where higher processing power may be needed may be performed in the Cloud.

With respect to the collection functionality implemented by the OTDR acquisition 806 (e.g., the monitoring data collector 152), battery pack monitoring data 156 such as thermal, pressure, current, charge state, etc., may be analyzed with respect to the analysis functionality implemented by the OTDR analysis 808 and temperature analysis 810 (e.g., the monitoring data analyzer 154).

Figure 9:
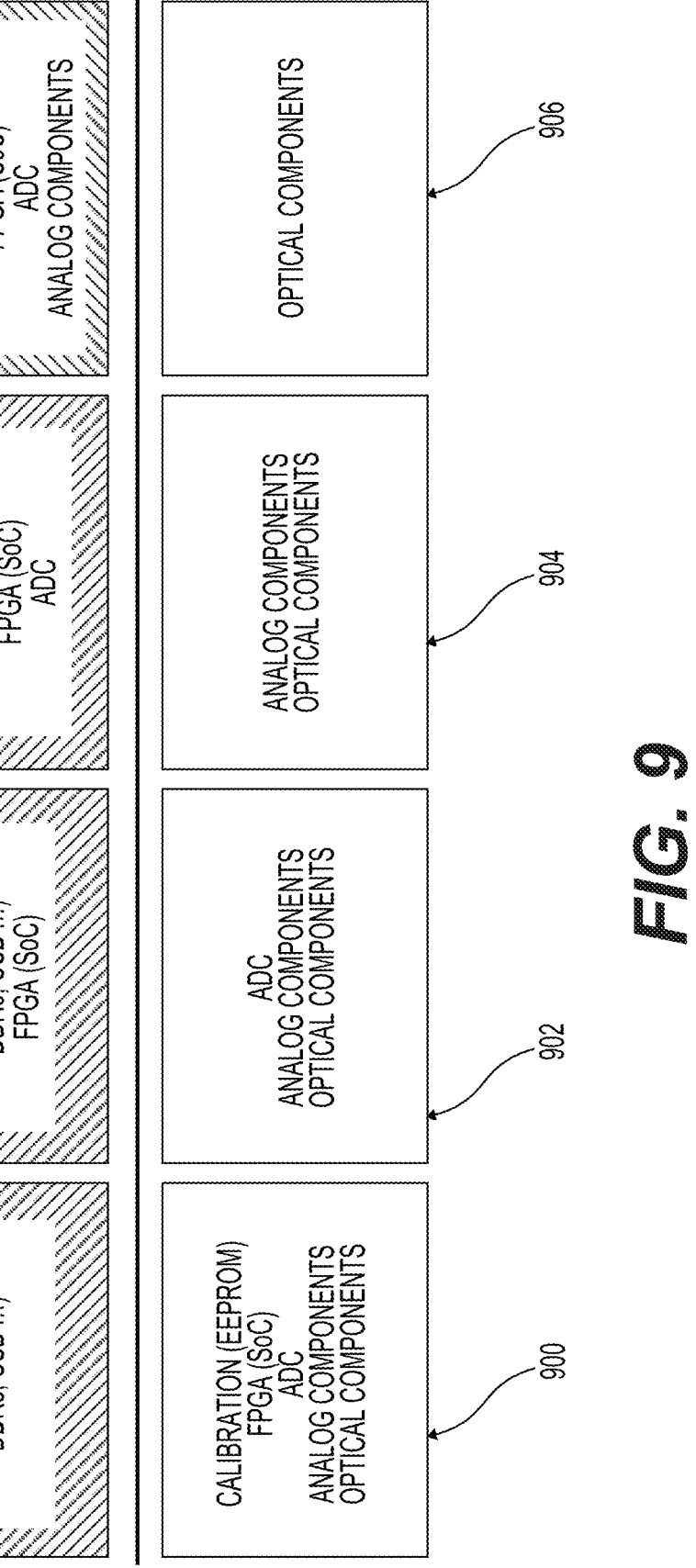
FIG. 9 illustrates disaggregated hardware considerations to illustrate operation of the data collection and analysis-based device monitoring system of FIG. 1A, according to an example of the present disclosure.

FIG. 9 illustrates disaggregated hardware considerations to illustrate operation of the monitoring system 100, according to an example of the present disclosure.

Referring to FIG. 9, with respect to the collection functionality implemented by the OTDR acquisition 806 (e.g., the monitoring data collector 152), various hardware elements may be utilized as shown to implement the monitoring data collector 152. For example, for the hardware elements at 900, specific calibration may be performed for each product. For the hardware elements at 902, considerations may include serial data rate, multiple pins, etc. For the hardware elements at 904, considerations may include whether a signal is fast/weak and an associated sampling resolution. For the hardware elements at 906, considerations may include whether a signal is fast/weak, etc.

Figure 10:
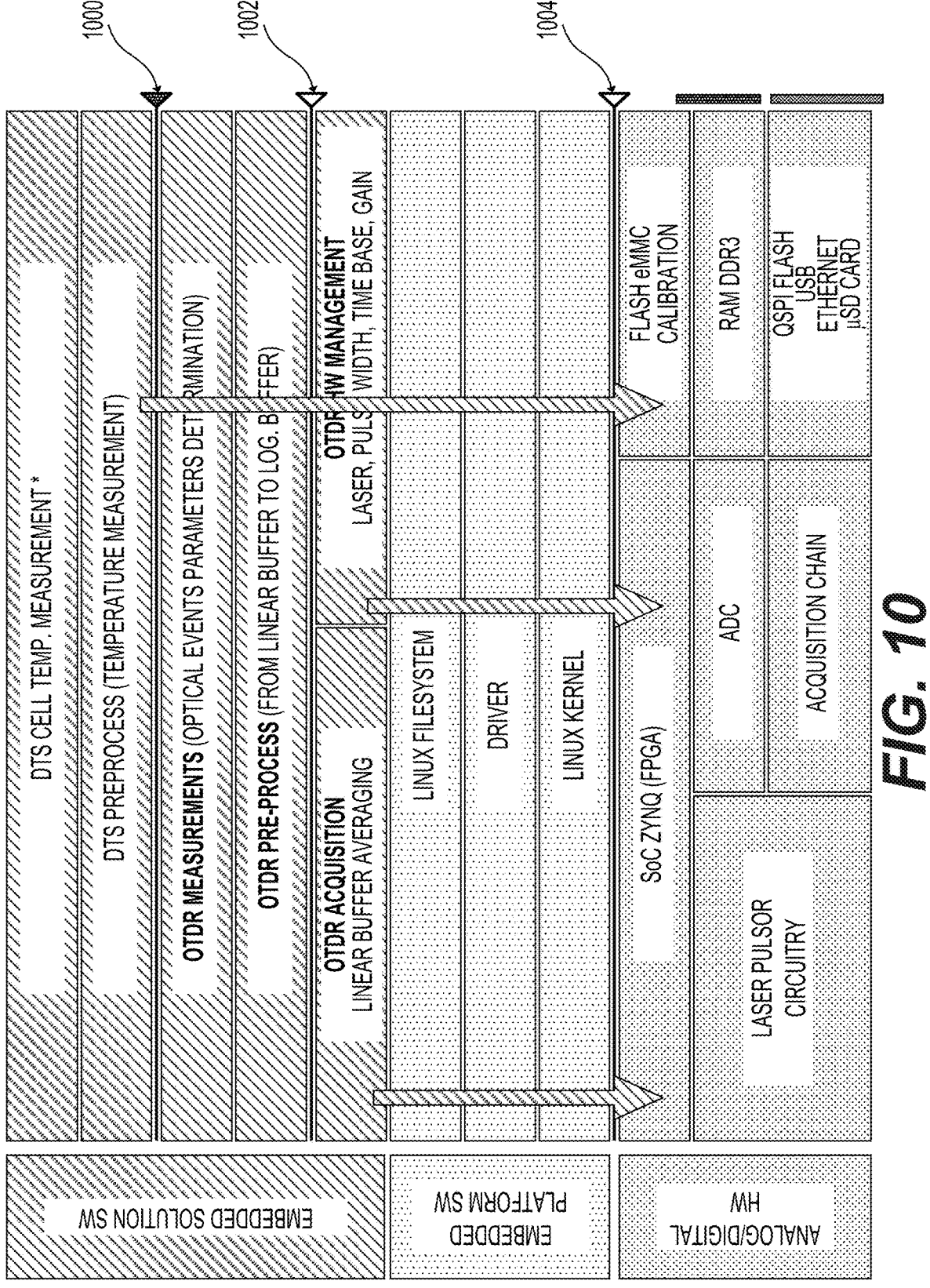
FIG. 10 illustrates separation of data collection from data processing to illustrate operation of the data collection and analysis-based device monitoring system of FIG. 1A, according to an example of the present disclosure.

FIG. 10 illustrates separation of data collection from data analysis to illustrate operation of the monitoring system 100, according to an example of the present disclosure.

Referring to FIG. 10, with respect to separation of the collection functionality implemented by the OTDR acquisition 806 (e.g., the monitoring data collector 152), and the analysis functionality implemented by the OTDR analysis 808 and temperature analysis 810 (e.g., the monitoring data analyzer 154), these functionalities may be separated as shown at 1000, 1002, or 1004. The separation at 1000, 1002, and 1004 may respectively represent a relatively low level separation, a relatively medium level separation, and a relatively high level separation, where the collection functionality may be performed by the components above the horizontal lines at 1000, 1002, and 1004 in the orientation of FIG. 10, and the analysis functionality may be performed by the components below the horizontal lines at 1000, 1002, and 1004. For example, the separation at 1000 may separate the collection functionality with respect to DTS temperature measurement. The separation at 1002 may separate the collection functionality with respect to DTS temperature measurement, and OTDR measurements. Further, the separation at 1004 may separate the collection functionality with respect to DTS temperature measurement, the OTDR measurements, and other components as shown in FIG. 10.

Figure 11:
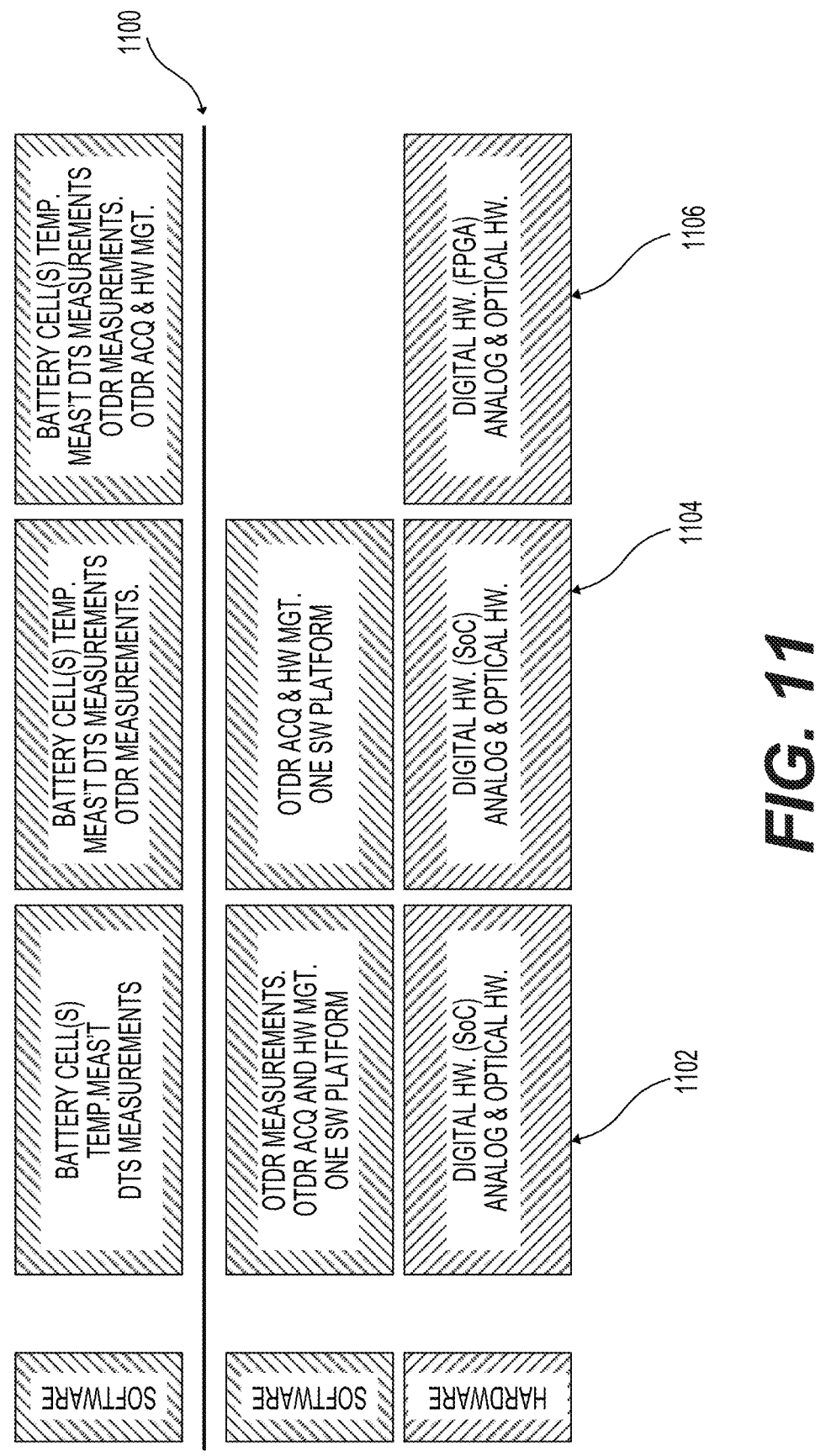
FIG. 11 illustrates a software separation architecture to illustrate operation of the data collection and analysis-based device monitoring system of FIG. 1A, according to an example of the present disclosure.

FIG. 11 illustrates a software separation architecture to illustrate operation of the monitoring system 100, according to an example of the present disclosure.

Referring to FIG. 11, according to another example, with respect to separation of the collection functionality implemented by the OTDR acquisition 806 (e.g., the monitoring data collector 152), and the analysis functionality implemented by the OTDR analysis 808 and temperature analysis 810 (e.g., the monitoring data analyzer 154), these functionalities may be separated as shown at 1100, with different implementation options being listed at columns 1102, 1104, and 1106. For example, the option at 1102 may separate the collection functionality with respect to DTS temperature measurement. The option at 1104 may separate the collection functionality with respect to DTS temperature measurement, and OTDR measurements. Further, the option at 1106 may separate the collection functionality with respect to DTS temperature measurement, the OTDR measurements, and other components as shown in FIG. 11. With respect to the separation at 1102, 1104, and 1106, by separating the software into various components, the software may be executed on separate modules or processing subsystems. This functionality may minimize the processing power to what is needed in each software module. It also allows a software module to be moved to various pieces of hardware that may not be directly tied to the physical hardware in the vehicle.

FIGS. 12-14 respectively illustrate an example block diagram 1200, a flowchart of an example method 1300, and a further example block diagram 1400 for data collection and analysis-based device monitoring, according to examples. The block diagram 1200, the method 1300, and the block diagram 1400 may be implemented on the system 100 described above with reference to FIGS. 1A and 1B by way of example and not of limitation. The block diagram 1200, the method 1300, and the block diagram 1400 may be practiced in other system. In addition to showing the block diagram 1200, FIG. 12 shows hardware of the system 100 that may execute the instructions of the block diagram 1200. The hardware may include a processor 1202, and a memory 1204 storing machine readable instructions that when executed by the processor cause the processor to perform the instructions of the block diagram 1200. The memory 1204 may represent a non-transitory computer readable medium. FIG. 13 may represent an example method for data collection and analysis-based device monitoring, and the steps of the method. FIG. 14 may represent a non-transitory computer readable medium 1402 having stored thereon machine readable instructions to provide data collection and analysis-based device monitoring according to an example. The machine readable instructions, when executed, cause a processor 1404 to perform the instructions of the block diagram 1400 also shown in FIG. 14.

The processor 1202 of FIG. 12 and/or the processor 1404 of FIG. 14 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1402 of FIG. 14), such as hardware storage devices (e.g., RAM (random access memory), ROM (read only memory), EPROM (erasable, programmable ROM), EEPROM (electrically erasable, programmable ROM), hard drives, and flash memory). The memory 1204 may include a RAM, where the machine readable instructions and data for a processor may reside during runtime.

Referring to FIGS. 1A-12, and particularly to the block diagram 1200 shown in FIG. 12, the memory 1204 may include instructions 1206 to obtain, from an optical fiber of a sensing membrane 102 that is used to monitor a thermal property of a device 160, monitoring data 156 associated with the monitoring of the thermal property of the device 160.

The processor 1202 may fetch, decode, and execute the instructions 1208 to forward the monitoring data 156 to the monitoring data analyzer 154 that is remote from the monitoring data collector 152.

The processor 1202 may fetch, decode, and execute the instructions 1210 to receive, from the monitoring data analyzer 154 and based on an analysis of the monitoring data 156 by the monitoring data analyzer 154, an indication of an operational status of the device 160.

The processor 1202 may fetch, decode, and execute the instructions 1212 to control, based on the indication of the operational status of the device 160, an operation of the device 160.

Referring to FIGS. 1A-11 and 13, and particularly FIG. 13, for the method 1300, at block 1302, the method may include receiving, from a remotely disposed monitoring data collector 152 that obtains, from an optical fiber of a sensing membrane 102 that is used to monitor a thermal property of a device 160, monitoring data 156 associated with the monitoring of the thermal property of the device 160.

At block 1304, the method may include forwarding, to the monitoring data collector 152 and based on an analysis of the monitoring data 156, an indication of an operational status 164 of the device 160.

Referring to FIGS. 1A-12 and 14, and particularly FIG. 14, for the block diagram 1400, the non-transitory computer readable medium 1402 may include instructions 1406 to obtain, from an optical fiber of a sensing membrane 102 that is used to monitor at least one of a thermal or a mechanical property of a device 160, monitoring data 156 associated with the monitoring of the at least one of the thermal or the mechanical property of the device 160.

The processor 1404 may fetch, decode, and execute the instructions 1408 to forward the monitoring data 156 to a remotely disposed monitoring data analyzer 154.

The processor 1404 may fetch, decode, and execute the instructions 3120 to receive, from the monitoring data analyzer 154 and based on an analysis of the monitoring data 156 by the monitoring data analyzer 154, an indication of an operational status 164 of the device 160.

The processor 1404 may fetch, decode, and execute the instructions 3113 to control, based on the indication of the operational status 164 of the device 160, an operation of the device 160.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A data collection and analysis-based battery pack monitoring system comprising:

a sensing membrane to monitor a thermal property of battery pack, the sensing membrane comprising a planar configuration and is to be positioned on an external surface of the device and comprising an optical fiber to collect monitoring data associated with the monitored thermal property of the battery pack;

a monitoring data collector to:

obtain, from the optical fiber of the sensing membrane that is used to monitor the thermal property of the battery pack, monitoring data associated with the monitored thermal property of the battery pack, forward the monitoring data to a monitoring data analyzer that is physically remote from the monitoring data collector, and receive, from the physically remote monitoring data analyzer and based on an analysis of the monitoring data by the physically remote monitoring data analyzer, an indication of an operational status of the battery pack; and a device controller to:

control, based on the indication of the operational status of the battery pack, an operation of the battery pack.

2. The data collection and analysis-based battery pack monitoring system according to claim 1, wherein the battery pack is a battery pack of an electric vehicle and wherein the monitoring data collector is implemented on the electric vehicle.

3. The data collection and analysis-based battery pack monitoring system according to claim 1, wherein the monitoring data analyzer is implemented in a Cloud.

4. The data collection and analysis-based battery pack monitoring system according to claim 1, wherein the sensing membrane includes a generally planar configuration.

5. The data collection and analysis-based battery pack monitoring system according to claim 1, wherein the device controller is to control, based on the indication of the operational status of the battery pack, the operation of the battery pack to disengage a flow of electricity at least one of to or from the battery pack.

6. The data collection and analysis-based battery pack monitoring system according to claim 1, wherein the device controller is to control, based on the indication of the operational status of the battery pack, a notification associated with the operational status of the battery pack to control the operation of the battery pack.

7. The data collection and analysis-based battery pack monitoring system according to claim 1, wherein the monitoring data collector is to forward the monitoring data to the monitoring data analyzer that is physically remote from the monitoring data collector via a Wi-Fi signal.

8. The data collection and analysis-based battery pack monitoring system according to claim 1, wherein the monitoring data collector is to forward the monitoring data to the monitoring data analyzer that is physically remote from the monitoring data collector via a cellular signal.

9. A method for data collection and analysis-based battery pack monitoring, the method comprising:

receiving, by at least one hardware processor, from a physically remotely disposed monitoring data collector that obtains, from an optical fiber of a sensing membrane comprising a planar configuration and positioned on an external surface of a battery pack to monitor a thermal property of the battery pack, monitoring data associated with the monitored thermal property of the battery pack by the sensing membrane comprising the optical fiber;

analyzing, by the at least one hardware processor, the monitoring data to determine an operational status of the battery pack; and forwarding, by the at least one hardware processor, to the physically remote monitoring data collector and based on the analysis of the monitoring data, an indication of an operational status of the battery pack, wherein the indication of the operational status of the battery pack is to be used to control an operation of the battery pack.

10. The method for data collection and analysis-based battery pack monitoring according to claim 9, wherein the battery pack is a battery pack of an electric vehicle.

11. The method for data collection and analysis-based battery pack monitoring according to claim 10, wherein the physically remotely disposed monitoring data collector is implemented in the electric vehicle.

12. The method for data collection and analysis-based battery pack monitoring according to claim 9, wherein forwarding, by the at least one hardware processor, to the physically remotely disposed monitoring data collector and based on the analysis of the monitoring data, the indication of the operational status of the battery pack further comprises:

forwarding, by the at least one hardware processor and via a Wi-Fi signal, to the monitoring data collector and based on the analysis of the monitoring data, the indication of the operational status of the battery pack.

13. The method for data collection and analysis-based battery pack monitoring according to claim 9, wherein forwarding, by the at least one hardware processor, to the physically remotely disposed monitoring data collector and based on the analysis of the monitoring data, the indication of the operational status of the battery pack further comprises:

forwarding, by the at least one hardware processor and via a cellular signal, to the monitoring data collector and based on the analysis of the monitoring data, the indication of the operational status of the battery pack.

14. A non-transitory computer readable medium having stored thereon machine readable instructions, the machine readable instructions, when executed by at least one hardware processor, cause the at least one hardware processor to:

obtain, from an optical fiber of a sensing membrane comprising a planar configuration and positioned on an external surface of a battery pack to monitor at least one of a thermal or a mechanical property of battery pack, monitoring data associated with the monitored at least one of the thermal or the mechanical property of the battery pack by the sensing membrane comprising the optical fiber;

forward the monitoring data to a physically remotely disposed monitoring data analyzer;

receive, from the physically remotely disposed monitoring data analyzer and based on an analysis of the monitoring data by the physically remotely disposed monitoring data analyzer, an indication of an operational status of the battery pack; and control, based on the indication of the operational status of the battery pack, an operation of the battery pack.

15. The non-transitory computer readable medium according to claim 14, wherein the battery pack is a battery pack of an electric vehicle.

16. The non-transitory computer readable medium according to claim 14, wherein the monitoring data analyzer is implemented in a Cloud.

17. The non-transitory computer readable medium according to claim 14, wherein the sensing membrane includes a generally planar configuration.

18. The non-transitory computer readable medium according to claim 14, wherein the machine readable instructions to control, based on the indication of the operational status of the battery pack, the operation of the battery pack, when executed by the at least one hardware processor, further cause the at least one hardware processor to:

control, based on the indication of the operational status of the battery pack, the operation of the battery pack to disengage a flow of electricity at least one of to or from the battery pack.

19. The non-transitory computer readable medium according to claim 14, wherein the machine readable instructions to control, based on the indication of the operational status of the battery pack, the operation of the battery pack, when executed by the at least one hardware processor, further cause the at least one hardware processor to:

generate, based on the indication of the operational status of the battery pack, a notification associated with the operational status of the battery pack.

20. The non-transitory computer readable medium according to claim 14, wherein the machine readable instructions to forward the monitoring data to the physically remotely disposed monitoring data analyzer, when executed by the at least one hardware processor, further cause the at least one hardware processor to:

forward, via a Wi-Fi or a cellular signal, the remotely disposed monitoring data analyzer.

\* \* \* \* \*